US012401081B2

(12) United States Patent
Stroud et al.

(10) Patent No.: US 12,401,081 B2
(45) Date of Patent: Aug. 26, 2025

(54) MODULAR BATTERY SYSTEM FOR POWER EQUIPMENT

(71) Applicant: THE TORO COMPANY, Bloomington, MN (US)

(72) Inventors: Adam B. Stroud, St. Paul, MN (US); Chris A. Wadzinski, Inver Grove Heights, MN (US); Reid M. Benjamin, Webster, MN (US); Tyler E. Peterson, Roberts, WI (US)

(73) Assignee: THE TORO COMPANY, Bloomington, MN (US)

( * ) Notice: Subject to any disclaimer, the term of this patent is extended or adjusted under 35 U.S.C. 154(b) by 424 days.

(21) Appl. No.: 17/797,201

(22) PCT Filed: Feb. 25, 2021

(86) PCT No.: PCT/US2021/019589
§ 371 (c)(1),
(2) Date: Aug. 3, 2022

(87) PCT Pub. No.: WO2021/178196
PCT Pub. Date: Sep. 10, 2021

(65) Prior Publication Data
US 2023/0050393 A1 Feb. 16, 2023

Related U.S. Application Data

(60) Provisional application No. 62/983,876, filed on Mar. 2, 2020.

(51) Int. Cl.
*H01M 50/258* (2021.01)
*B60L 53/80* (2019.01)
(Continued)

(52) U.S. Cl.
CPC .......... *H01M 50/258* (2021.01); *B60L 53/80* (2019.02); *B60L 58/12* (2019.02); *B60L 58/22* (2019.02);
(Continued)

(58) Field of Classification Search
CPC ............ H01M 50/258; H01M 50/209; H01M 50/264; H01M 50/256; H01M 50/291;
(Continued)

(56) References Cited

U.S. PATENT DOCUMENTS 11,165,109 B2 * 11/2021 Ohkuma ........... H01M 10/6554
2003/0211382 A1 11/2003 Aoyama
(Continued)

FOREIGN PATENT DOCUMENTS

CN 204481067 7/2015
EP 2583858 4/2013
(Continued)

OTHER PUBLICATIONS

International Search Report and Written Opinion for PCT/US2021/019589, dated Oct. 21, 2021; 22 pgs.
(Continued)

*Primary Examiner* — Raymond Alejandro
(74) *Attorney, Agent, or Firm* — Mueting Raasch Group

(57) ABSTRACT

A battery pack is provided that includes battery cell magazines and a battery management system to control charging and discharging of the associated battery pack. The battery cell magazines may include a magazine housing and associated battery cells. The magazine housing may define a plurality of battery cell recesses to receive the battery cells. The battery management system may be configured to balance the state of charge of a battery stack of battery (Continued)

packs. Methods for balancing a state of charge of battery packs of a battery stack are also provided, as are systems for lifting a battery stack.

16 Claims, 21 Drawing Sheets

(51) Int. Cl.
*B60L 58/12* (2019.01)
*B60L 58/22* (2019.01)
*H01M 10/42* (2006.01)
*H01M 10/44* (2006.01)
*H01M 10/48* (2006.01)
*H01M 50/209* (2021.01)
*H01M 50/213* (2021.01)
*H01M 50/22* (2021.01)
*H01M 50/256* (2021.01)
*H01M 50/264* (2021.01)
*H01M 50/284* (2021.01)
*H01M 50/291* (2021.01)
*H02J 7/00* (2006.01)
*A01D 34/67* (2006.01)
*A01D 34/78* (2006.01)
*A01D 101/00* (2006.01)

(52) U.S. Cl.
CPC ....... *H01M 10/425* (2013.01); *H01M 10/441* (2013.01); *H01M 10/482* (2013.01); *H01M 10/486* (2013.01); *H01M 50/209* (2021.01); *H01M 50/213* (2021.01); *H01M 50/22* (2021.01); *H01M 50/256* (2021.01); *H01M 50/264* (2021.01); *H01M 50/284* (2021.01); *H01M 50/291* (2021.01); *H02J 7/0013* (2013.01); *A01D 34/67* (2013.01); *A01D 34/78* (2013.01); *A01D 2101/00* (2013.01); *H01M 2010/4271* (2013.01); *H01M 2220/20* (2013.01)

(58) Field of Classification Search
CPC ............. H01M 50/213; H01M 50/284; H01M 10/425; H01M 10/441; H01M 10/482; H01M 10/486; H01M 2010/4271; H01M 2220/20; B60L 58/22; B60L 58/12; B60L 53/80; H02J 7/0013; A01D 34/67; A01D 34/78; A01D 2101/00
See application file for complete search history.

(56) References Cited

U.S. PATENT DOCUMENTS

| | | | |
|---|---|---|---|
| 2011/0123848 | A1 | 5/2011 | Han |
| 2017/0346144 | A1* | 11/2017 | Addanki ............. H01M 50/271 |
| 2020/0067045 | A1* | 2/2020 | Takano ............... H01M 50/342 |

FOREIGN PATENT DOCUMENTS

| | | |
|---|---|---|
| KR | 20110057590 | 6/2011 |
| WO | 2008/106641 | 9/2008 |
| WO | 2014/145756 | 9/2014 |
| WO | 2018/031719 | 2/2018 |
| WO | 2019/213407 | 11/2019 |
| WO | 2021/178196 | 9/2021 |

OTHER PUBLICATIONS

International Preliminary Report on Patentability prepared by the IPEA for PCT/US2021/019589, dated Jul. 8, 2022; 35 pgs.

* cited by examiner

Fig. 14

| Material Name | Exemplary Thermal Conductivity | Exemplary Density | Exemplary Specific Heat Capacity | Volumetric Heat Capacity* |
|---|---|---|---|---|
| Units | watts / (meter*kelvin) | kilogram / meter$^3$ | joule / (kilogram*kelvin) | kilojoule / (kelvin*meter$^3$) |
| HDPE | 0.46 | 953 | 2400 | 2287 |
| Aluminum | 204 | 2700 | 910 | 2457 |
| D3612 Coolpoly | 14 | 1600 | 1100 | 1760 |
| ABS | 0.18 | 1080 | 1675 | 1809 |
| PC | 0.21 | 1200 | 1500 | 1800 |
| PA66 GF30 | 0.45 | 940 | 1500 | 1410 |
| Air | 0.02 | 1.2 | 1000 | 1.2 |

* Volumetric Heat Capacity is equal to the product of Material Density and Specific Heat Capacity

MODULAR BATTERY SYSTEM FOR POWER EQUIPMENT

The present application is a 35 U.S.C. § 371 U.S. National Stage of International Application No. PCT/US2021/019589, filed 25 Feb. 2021, which claims priority to and/or the benefit of U.S. Provisional Patent Application No. 62/983,876, filed 2 Mar. 2020, all of which are incorporated herein by reference in their entireties.

Embodiments of the present disclosure relate to battery packs and, more particularly, to battery packs for use with indoor and outdoor power equipment (e.g., lawn mowers, demolition equipment, and the like).

BACKGROUND

Power equipment is well-known in both consumer and professional markets alike. While not an exhaustive list, such equipment may include walk-behind and riding lawn mowers, snow throwers, trimmers, utility loaders, demolition/construction equipment, etc. Such equipment is available in a wide range of sizes and configurations to accommodate particular end-user needs. For example, lawn mowers may be configured as walk-behind or ride-on vehicles having grass cutting decks of varying cutting widths. To power the deck, as well as an optional propulsion system, such mowers may include an internal combustion engine.

More recently, mowers (as well as other power equipment) incorporating one or more battery-powered electric motors in place of the internal combustion engine have grown in popularity. Such mowers typically include a rechargeable battery pack to power the motor(s) during operation.

SUMMARY

Embodiments described herein may provide a battery cell magazine that includes a plurality of battery cells and a magazine housing. Each of the plurality of battery cells may include a first base surface, a second base surface, and one or more sidewalls extending between the first base surface and the second base surface. The one or more sidewalls may define a surface area. The magazine housing may define a plurality of cell recesses each configured to receive a battery cell of the plurality of battery cells. Each of the plurality of cell recesses may define an inner surface configured to be in direct contact with at least 50 percent of the surface area of the one or more sidewalls of the battery cell received therein. The magazine housing may include a first segment, a second segment, and one or more retainers. The first segment may include a first portion of the inner surface of each of the plurality of cell recesses. The second segment may oppose the first segment. Furthermore, the second segment may include a second portion of the inner surface of each of the plurality of cell recesses. The one or more retainers may be configured to secure the first and second segments relative to the plurality of battery cells.

In other embodiments, a battery pack is provided that includes a plurality of battery cell magazines and a battery management system. Each of the battery cell magazines may include a plurality of battery cells and a magazine housing. Each of the plurality of battery cells may include a first base surface, a second base surface, and one or more sidewalls extending between the first base surface and the second base surface. The one or more sidewalls may define a surface area. The magazine housing may define a plurality of cell recesses each configured to receive a battery cell of the plurality of battery cells. Each of the plurality of cell recesses may define an inner surface configured to be in direct contact with at least 50 percent of the surface area of the one or more sidewalls of the battery cell received therein. The magazine housing may include a first segment, a second segment, and one or more retainers. The first segment may include a first portion of the inner surface of each of the plurality of cell recesses. The second segment may oppose the first segment. Furthermore, the second segment may include a second portion of the inner surface of each of the plurality of cell recesses. The one or more retainers may be configured to secure the first and second segments relative to the plurality of battery cells. The battery management system may be operatively coupled to the plurality of battery cell magazines and configured to control charging and discharging of the plurality of battery cell magazines.

In other embodiments, a battery stack is provided that includes a battery leader and one or more support batteries. The battery leader may be configured to communicate with a host system and the battery leader may include a battery pack. The one or more support batteries may be operatively coupled to the battery leader, and each support battery may include a battery pack. Furthermore, each battery pack may include a battery management system configured to control charging and discharging of the associated battery pack (that includes the battery management system), and to determine which of the battery packs is the battery leader.

In other embodiments, a battery management system is provided that includes a multicell battery, power protection circuitry, a battery monitoring circuit, a low voltage cutoff circuit, and a wakeup circuit. The power protection circuitry may be operatively coupled to a positive terminal of the multicell battery to control charging and discharging of the multicell battery. The battery monitoring circuit may be operatively coupled to the multicell battery to monitor operating conditions of the multicell battery. Furthermore, the battery monitoring circuit may be operatively coupled to the power protection circuitry to control the power protection circuitry based on the operating conditions of the multicell battery. The low voltage cutoff circuit may be operatively coupled to the positive terminal of the multicell battery to provide a current limited power supply based on a voltage of the multicell battery. The wakeup circuit may be operatively coupled to the low voltage cutoff circuit to receive the current limited power supply. Furthermore, the wakeup circuit may be operatively coupled to the battery monitoring circuit, and the wakeup circuit may be configured to turn on (activate) the battery monitoring circuit in response to a wakeup signal when the current limited power supply is provided by the low voltage cutoff circuit.

In other embodiments, a method is provided for balancing a state of charge of battery packs of a battery stack while powering a host system. The method includes determining a threshold level of power required by the host system, determining a minimum number of battery packs needed to provide the threshold level of power, determining a state of charge of each of the battery packs, determining a subset of the battery packs based on the minimum number of battery packs and the state of charge of each of the battery packs, and instructing the subset of the battery packs to provide power at a duty cycle less than 100 percent.

In other embodiments, a method is provided for balancing a state of charge of battery packs of a battery stack during charging. The method includes determining a state of charge of each of the battery packs, determining a subset of the battery packs that have a highest state of charge of the battery packs based on the state of charge of each of the battery packs, instructing the subset of the battery packs to charge at a duty cycle less than 100 percent, and instructing remaining battery packs to charge continuously, wherein the remaining battery packs are the battery packs of the battery stack that are not in the subset of battery packs.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein:

FIG. 14 is a table showing thermal properties for a variety of different materials;

Figure 1A:
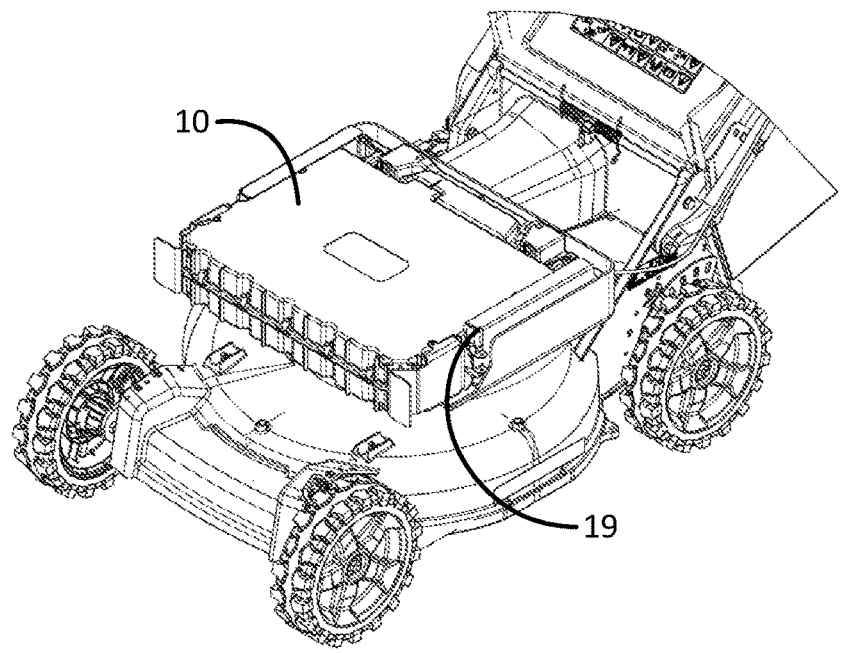
FIG. 1A is a partial isometric view of an exemplary power equipment unit (e.g., a walk-behind mower) incorporating a modular battery system in accordance with embodiments of the present disclosure.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about." Further, the term "and/or" (if used) means one or all of the listed elements or a combination of any two or more of the listed elements. Still further, "i.e." may be used herein as an abbreviation for the Latin phrase id est and means "that is," while "e.g.," may be used as an abbreviation for the Latin phrase exempli gratia and means "for example."

It is noted that the terms "comprises" and variations thereof do not have a limiting meaning where these terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective shown in the particular figure. These terms are used only to simplify the description, however, and not to limit the interpretation of any embodiment described.

Embodiments of the present disclosure are directed to modular battery packs for power equipment units (e.g., a mower). Such battery packs may include battery cell magazines and a battery management system (BMS). Each of the battery cell magazines may include a magazine housing and battery cells. Moreover, each magazine housing may include a plurality of cell recesses each configured to receive a battery cell. Each magazine housing may be formed from material with a high volumetric heat capacity. The BMS may be configured to keep the associated battery pack within safe operating parameters (e.g., maintain safe operating conditions) independent of a host system or other operatively coupled battery packs. The BMS may control charging and discharging of the battery pack to maintain safe operating conditions of the battery pack. Battery packs and systems in accordance with embodiments of the present disclosure may provide a modular battery pack that can be used across a broad range of power equipment and may be combined or "stacked" to produce battery systems providing correspondingly greater energy storage capacity.

Aspects of the invention are defined in the claims. However, below is provided a non-exhaustive list of non-limiting examples. Any one or more of the features of these examples may be combined with any one or more features of another example, embodiment, or aspect described herein.

Example Ex1: A battery cell magazine comprising: a plurality of battery cells, each of the plurality of battery cells comprising: a first base surface; a second base surface; and one or more sidewalls extending between the first base surface and the second base surface, the one or more sidewalls defining a surface area. The battery cell magazine further includes a magazine housing defining a plurality of cell recesses each configured to receive a battery cell of the plurality of battery cells, each of the plurality of cell recesses defining an inner surface configured to be in direct contact with at least 50 percent of the surface area of the one or more sidewalls of the battery cell received therein. The magazine housing comprises: a first segment comprising a first portion of the inner surface of each of the plurality of cell recesses; a second segment configured to oppose the first segment, the second segment comprising a second portion of the inner surface of each of the plurality of cell recesses; and one or more retainers configured to secure the first and second segments relative to the plurality of battery cells.

Example Ex2: The battery cell magazine as in example Ex1, wherein the magazine housing is formed of a material with a volumetric heat capacity of at least 1000 kilojoules/degree Kelvin·meter$^3$ (kJ/K·m$^3$).

Example Ex3: The battery cell magazine as in any one of the previous examples, wherein the magazine housing is configured to provide an electrically insulative barrier between an anode and a cathode of each of the plurality of battery cells.

Example Ex4: The battery cell magazine as in any one of the previous examples, wherein the magazine housing is formed of a material that is electrically insulative.

Example Ex5: The battery cell magazine as in any one of the previous examples, wherein the magazine housing defines at least one window that exposes a portion of at least one of the one or more sidewalls of one of the plurality of battery cells.

Example Ex6: The battery cell magazine as in any one of the previous examples, wherein the magazine housing further comprises: a first set of windows that expose at least a portion of the first base surface of each of the plurality of battery cells; and a second set of windows that expose at least a portion of the second base surface of each of the plurality of battery cells.

Example Ex7: The battery cell magazine as in any one of the previous examples, wherein the magazine housing further comprises a living hinge between the first and second segments configured to allow the magazine housing to move between a first position and a second position.

Example Ex8: The battery cell magazine as in any one of examples Ex1 to Ex6, wherein the first and second segments each comprise a plurality of retainers, and wherein the plurality of retainers of the first segment releasably retain each received battery cell of the plurality of battery cells relative to the first segment and the plurality of retainers of the second segment releasably retain each received battery cell of the plurality of battery cells relative to the second segment.

Example Ex9: The battery cell magazine as in any one of the previous examples, wherein each of the plurality of battery cells comprise cylindrical battery cells and the one or more sidewalls define a curved surface.

Example Ex10: A battery pack including a plurality of battery cell magazines each according to example Ex1; and a battery management system operatively coupled to the plurality of battery cell magazines and configured to control charging and discharging of the plurality of battery cell magazines.

Example Ex11: The battery pack as in example Ex10, wherein the battery management system further comprises a bidirectional switch.

Example Ex12: The battery pack as in example Ex11, wherein the bidirectional switch comprises at least two sets of field effect transistors (FETs).

Example Ex13: The battery pack as in one of examples Ex10 to Ex12, wherein the battery management system further comprises a current shunt to monitor a battery pack current.

Example Ex14: The battery pack as in any one of examples Ex10 to Ex13, wherein the battery management system further comprises a pre-discharge control circuit configured to limit current flow out of the battery pack.

Example Ex15: The battery pack as in any one of examples Ex10 to Ex14, wherein the battery management system further comprises a pre-charge circuit configured to limit current flow into the battery pack.

Example Ex16: The battery pack as in any one of examples Ex10 to Ex15, wherein the battery management system further comprises a housing configured to house the plurality of battery cell magazines, the housing defining integral handles configured to assist with lifting the battery pack.

Example Ex17: The battery pack as in any one of examples Ex10 to Ex16, further comprising one or more thermistors, each of the one or more thermistors coupled to a sidewall of the one or more sidewalls of one of the plurality of battery cells.

Example Ex18: A battery stack comprising: a battery leader configured to communicate with a host system, the battery leader comprising a battery pack; and one or more support batteries operatively coupled to the battery leader, each support battery comprising a battery pack. Each battery pack comprises a battery management system configured to: control charging and discharging of the associated battery pack; and determine which of the battery packs is the battery leader.

Example Ex19: The battery stack as in example Ex18, wherein the battery management system of each of the one or more support batteries is configured to provide power based on a command signal provided by the battery leader.

Example Ex20: The battery stack as in either example Ex18 or Ex19, wherein the battery leader is configured to control charging between battery packs of the battery stack.

Example Ex21: The battery stack as in any one of examples Ex18 to Ex20, wherein the battery leader is configured to classify each of the one or more support batteries as an active usage battery pack or a pending usage battery pack.

Example Ex22: The battery stack as in example Ex21, wherein the battery leader is configured to provide a cease command signal to the battery management system of each pending usage battery pack to cease charging and discharging.

Example Ex23: The battery stack as in example Ex21, wherein the battery leader is configured to classify a support battery of the one or more support batteries as a pending usage battery pack if the support battery has an active fault.

Example Ex24: The battery stack as in any one of examples Ex18 to Ex23, wherein the battery leader is designated by a jumper or a switch.

Example Ex25: The battery stack as in any one of examples Ex18 to Ex24, wherein each battery pack comprises a magazine housing defining a plurality of cell recesses each configured to receive a battery cell of a plurality of battery cells, each of the plurality of cell recesses defining an inner surface configured to be in direct contact with at least 50 percent of a surface area of one or more sidewalls of the battery cell received therein. The magazine housing comprises: a first segment comprising a first portion of the inner surface of each of the plurality of cell recesses; a second segment configured to oppose the first segment, the second segment comprising a second portion of the inner surface of each of the plurality of cell recesses; and one or more retainers configured to secure the first and second segments relative to the plurality of battery cells.

Example Ex26: The battery stack as in any one of examples Ex18 to Ex25, further comprising a stack lifter configured to simultaneously lift the battery leader and the one or more support batteries, the stack lifter comprising lift members configured to engage corresponding integral handles of each of the battery leader and the one or more support batteries when the battery leader and the one or more support batteries are aligned with one another.

Example Ex27: A battery management system comprising: a multicell battery; power protection circuitry operatively coupled to a positive terminal of the multicell battery to control charging and discharging of the multicell battery; a battery monitoring circuit operatively coupled to the multicell battery to monitor operating conditions of the multicell battery, the battery monitoring circuit operatively coupled to the power protection circuitry to control the power protection circuitry based on the operating conditions of the multicell battery; a low voltage cutoff circuit operatively coupled to the positive terminal of the multicell battery to provide a current limited power supply based on a voltage of the multicell battery; and a wakeup circuit operatively coupled to the low voltage cutoff circuit to receive the current limited power supply, the wakeup circuit operatively coupled to the battery monitoring circuit, and wherein the wakeup circuit is configured to turn on the battery monitoring circuit in response to a wakeup signal when the current limited power supply is provided by the low voltage cutoff circuit.

Example Ex28: The battery management system as in example Ex27, wherein the battery monitoring circuit is configured to: determine at least one unsafe operating condition of the multicell battery; and cease charging and discharging of the multicell battery based on the at least one unsafe operating condition of the multicell battery.

Example Ex29: The battery management system as in either example Ex27 or Ex28, wherein the low voltage cutoff circuit is configured to cut off the current limited power supply when the voltage of the multicell battery is at or below a threshold voltage.

Example Ex30: The battery management system as in any one of examples Ex27 to Ex29, further comprising a wakeup switch operatively coupled to the wakeup circuit to provide the wakeup signal in response to a user input.

Example Ex31: The battery management system as in any one of examples Ex27 to Ex30, wherein the wakeup circuit is configured to turn on the battery monitoring circuit in response to a charging current being provided to the multicell battery by an external device.

Example Ex32: A method for balancing a state of charge of battery packs of a battery stack while powering a host system, the method comprising: determining a threshold level of power required by the host system; determining a minimum number of battery packs needed to provide the threshold level of power; determining a state of charge of each of the battery packs; determining a subset of the battery packs based on the minimum number of battery packs and the state of charge of each of the battery packs; and instructing the subset of the battery packs to provide power at a duty cycle less than 100 percent.

Example Ex33: The method as in example Ex32, wherein the duty cycle is based on the state of charge of each of the battery packs.

Example Ex34: The method as in either example Ex32 or example Ex33, wherein the duty cycle is at least 10 percent and no greater than 90 percent.

Example Ex35: The method as in any one of examples Ex32 to Ex34, further comprising: determining a voltage of each of the battery packs; and instructing the subset of battery packs to provide power at a duty cycle of 100 percent in response to the voltage of each of the battery packs being greater than a lower threshold voltage.

Example Ex36: The method as in any one of examples Ex32 to Ex35, further comprising: determining a number of battery packs that can provide power to the host system based on the state of charge of each of the battery packs; and instructing the battery packs to cease providing power to the host system in response to determining that the number of battery packs that can provide power to the host system is less than the number of battery packs needed to provide the threshold level of power.

Example Ex37: A method for balancing a state of charge of battery packs of a battery stack during charging, the method comprising: determining a state of charge of each of the battery packs; determining a subset of the battery packs that have a highest state of charge of the battery packs based on the state of charge of each of the battery packs; instructing the subset of the battery packs to charge at a duty cycle less than 100 percent; and instructing remaining battery packs to charge continuously, wherein the remaining battery packs are the battery packs of the battery stack that are not in the subset of battery packs.

Example Ex38: The method as in example Ex37, wherein the duty cycle is at least 10 percent and no greater than 90 percent.

Example Ex39: The method as in any either example Ex37 or example Ex38, further comprising determining a duty cycle for each battery pack of the subset of battery packs based on the state of charge of each of the battery packs.

Example Ex40: The method as in any one of examples Ex37 to Ex39, further comprising determining a voltage of each of the battery packs; and instructing the subset of battery packs to charge at a duty cycle of 100 percent in response to the voltage of each of the battery packs being less than an upper threshold voltage.

Figure 1B:
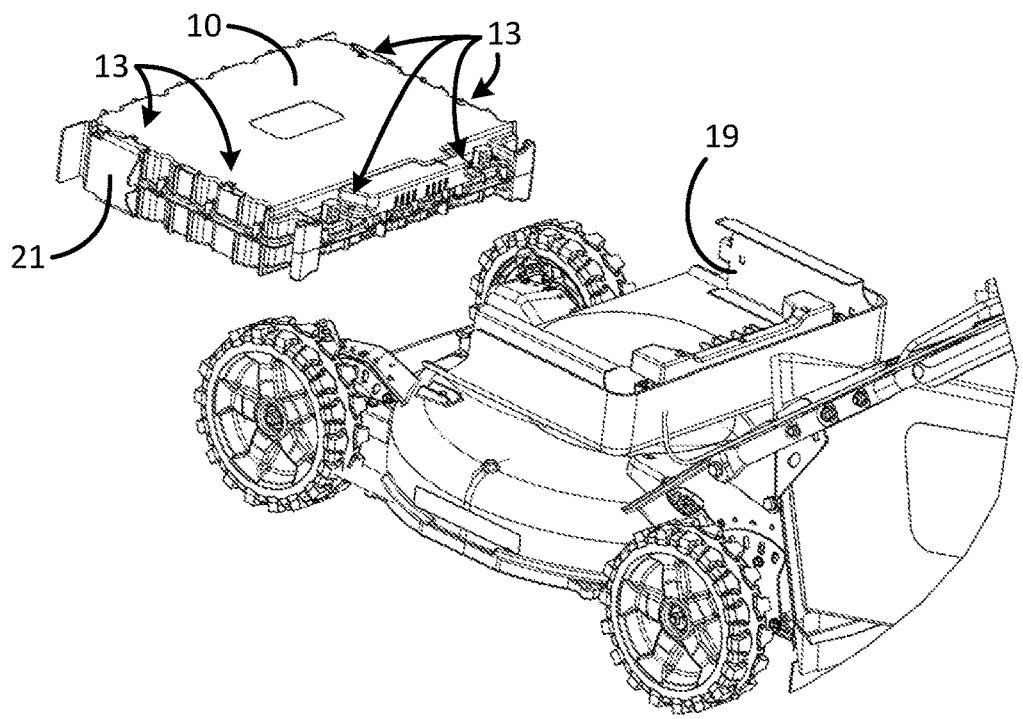
FIG. 1B is an isometric view of the exemplary power equipment unit of FIG. 1A with the battery pack removed.

FIG. 1A illustrates an isometric view of an exemplary power equipment unit (e.g., a walk-behind lawn mower) incorporating a battery pack 10 and FIG. 1B illustrates the exemplary power equipment unit with the battery pack 10 removed. When incorporated into a power equipment unit, the battery pack 10 may be operatively coupled to the power equipment unit to provide power to and communicate with the power equipment unit. "Operatively coupled" as used herein generally refers to a direct or indirect connection (e.g., wired or wireless) that provides a link for power and/or communication between apparatus, devices, or systems. Communication may include signals, commands, data transfers, etc.

Figure 16:
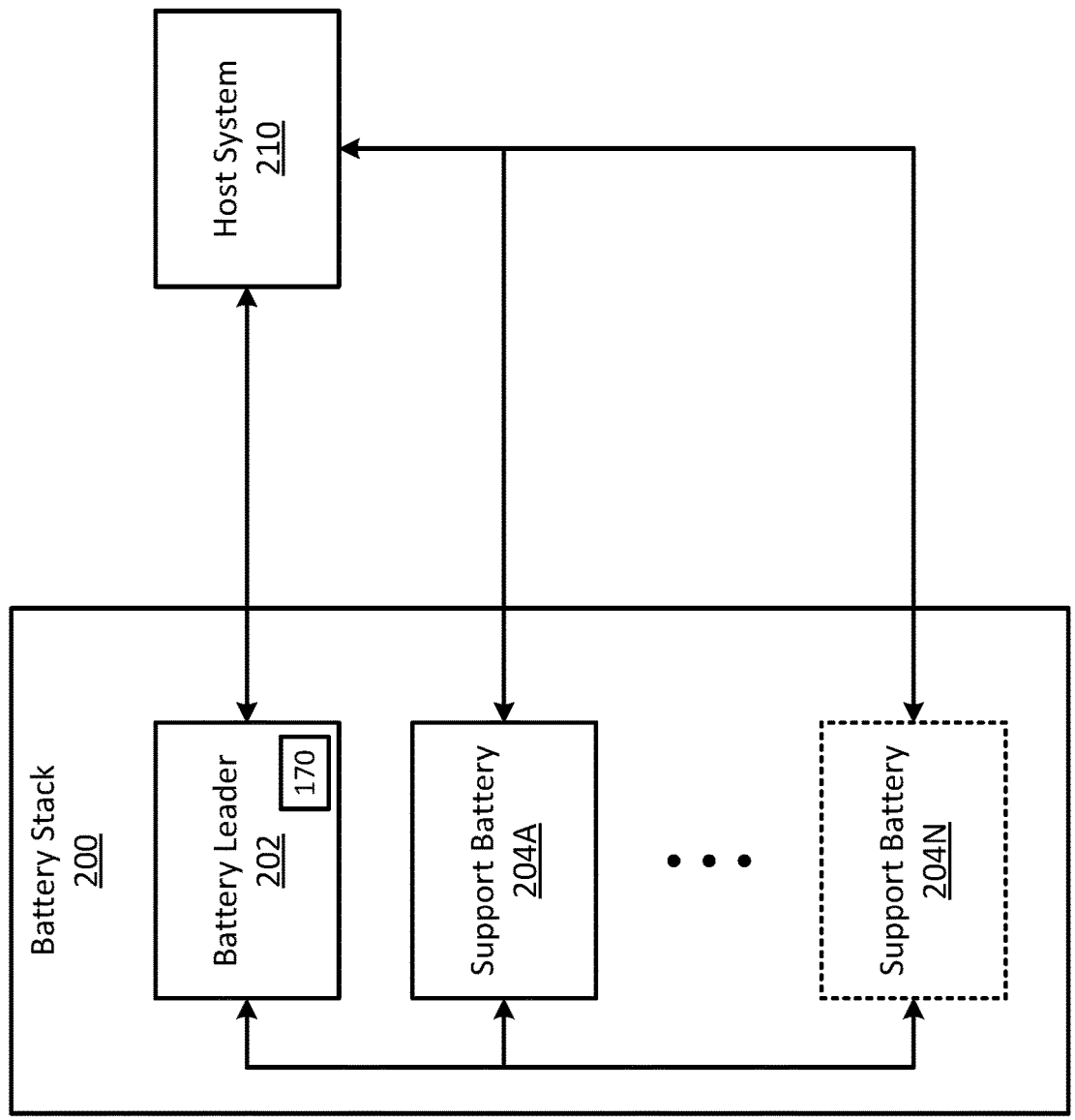
FIG. 16 is a schematic block diagram of a battery stack in accordance with embodiments of this disclosure.

The battery pack 10 may be operatively couplable to any host system (e.g., host system 210 of FIG. 16). As used herein, "host system" may include most any system to which the battery pack is intended to connect. Exemplary, host systems may include any system or apparatus such as, for example, power equipment, other battery packs (for "stacked" battery configurations as further described below), a battery charger, a diagnostic device, etc. As used herein, "power equipment" (also referred to herein as "power equipment unit") may include, for example, backpack-based appliances (e.g., debris blowers and trimmers), walk-behind and riding mowers, snow throwers, aerators, spreader/sprayers, compactors, trenchers, stand-on vehicles, ride-on vehicles, skid-steer vehicles, demolition and construction equipment, whether manually controlled or fully or semi-autonomously controlled.

This description includes headings/subheadings for organizational purposes only. That is, the particular headings/subheadings are not intended to limit in any way the embodiments described therein, i.e., alternative embodiments and additional description may be found elsewhere in the specification. Accordingly, the specification is to be considered as a whole.

Battery Pack

Figure 2A:
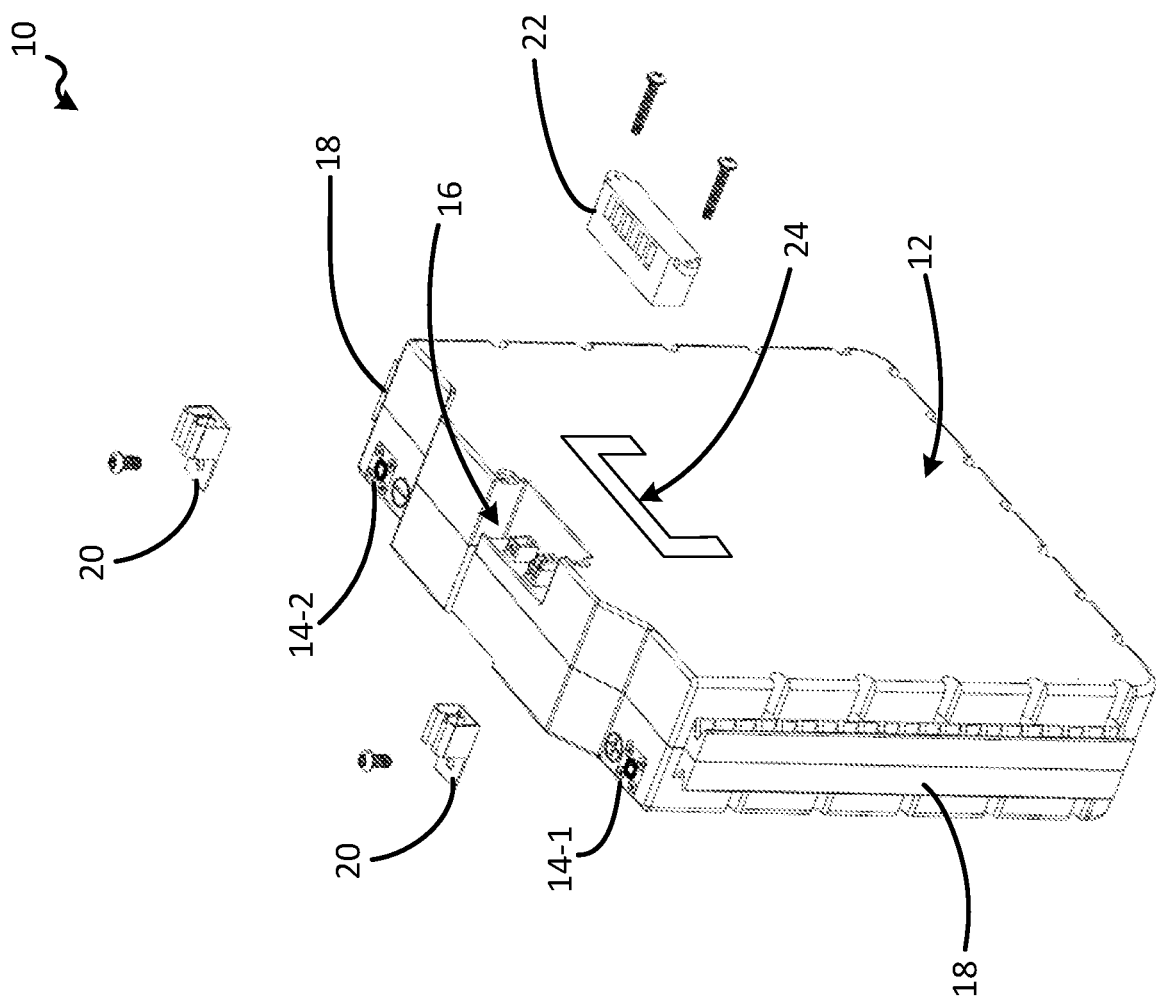
FIG. 2A is an isolated isometric view of an exemplary battery pack.

FIG. 2A illustrates an isometric view of an exemplary battery pack 10 with terminal connectors shown exploded therefrom. As shown in this view, the battery pack 10 may include a pack housing 12, power terminals (e.g., positive terminal 14-1 and negative terminal 14-2, individually and collectively referred to as "power terminals 14"), and a communication terminal 16. The battery pack housing 12 may be configured (e.g., sealed) to reduce or eliminate water, dust, and/or other debris ingress. In addition, the battery pack housing 12 may provide robust impact protection for the components contained therein. Still further, the battery pack housing 12 may be formed of electrically insulative materials adapted to prevent shorting of electrical components contained within the battery pack 10. Among other components, the battery pack may include a plurality of battery cell magazines as described herein, and a battery management system operatively coupled to the battery cell magazines. The battery management system may control charging and discharging of the battery cell magazines as described herein.

The power terminals 14 may be used to operatively couple the battery pack to other devices such as, for example, a host system (see, e.g., exemplary host system 210 in FIG. 16). The power terminals 14 may provide electrical connection (for charging and discharging) to battery cells contained within the battery pack. Connectors 20 may be coupled to power terminals 14 to allow the power terminals to be operatively coupled to a variety of host system power terminals. The connectors 20 may, for example, be "quick" connectors that permit the battery pack 10 to be connected to/disconnected from a host system without the need for tools.

The communication terminal 16 may be used to operatively couple a BMS (described in more detail below) of the battery pack 10 to the host system. The communication terminal 16 may include one or more communication bus interfaces or connectors such as, for example, a serial bus interface, a universal serial bus (USB) interface, Controller Area Network (CAN) bus interface, etc. The battery pack 10 may also include an external connector 22 operatively coupled to the communication terminal 16. The external connector 22 may separate the various signals provided to/by the communication terminal 16 and may further provide a toolless connection mechanism for a mating connector on the host system. Moreover, the external connector 22 may allow an operator to attach signal connectors individually.

The pack housing 12 may further include mounting rails 18. The mounting rails 18 may be received by corresponding mounting surfaces of the host system. For instance, the mounting rails 18 may be configured to engage a rail channel 19 (see FIGS. 1A and 1B) on the host system. The mounting rails 18 may be configured to prevent movement of the battery pack 10 in directions other than the direction of insertion into and removal from the rail channel 19. The pack housing 12 may further include carry handles 24. While not wishing to be bound to any particular configuration, the carry handles 24 may be collapsible or otherwise concealable when not in use.

Figure 2B:
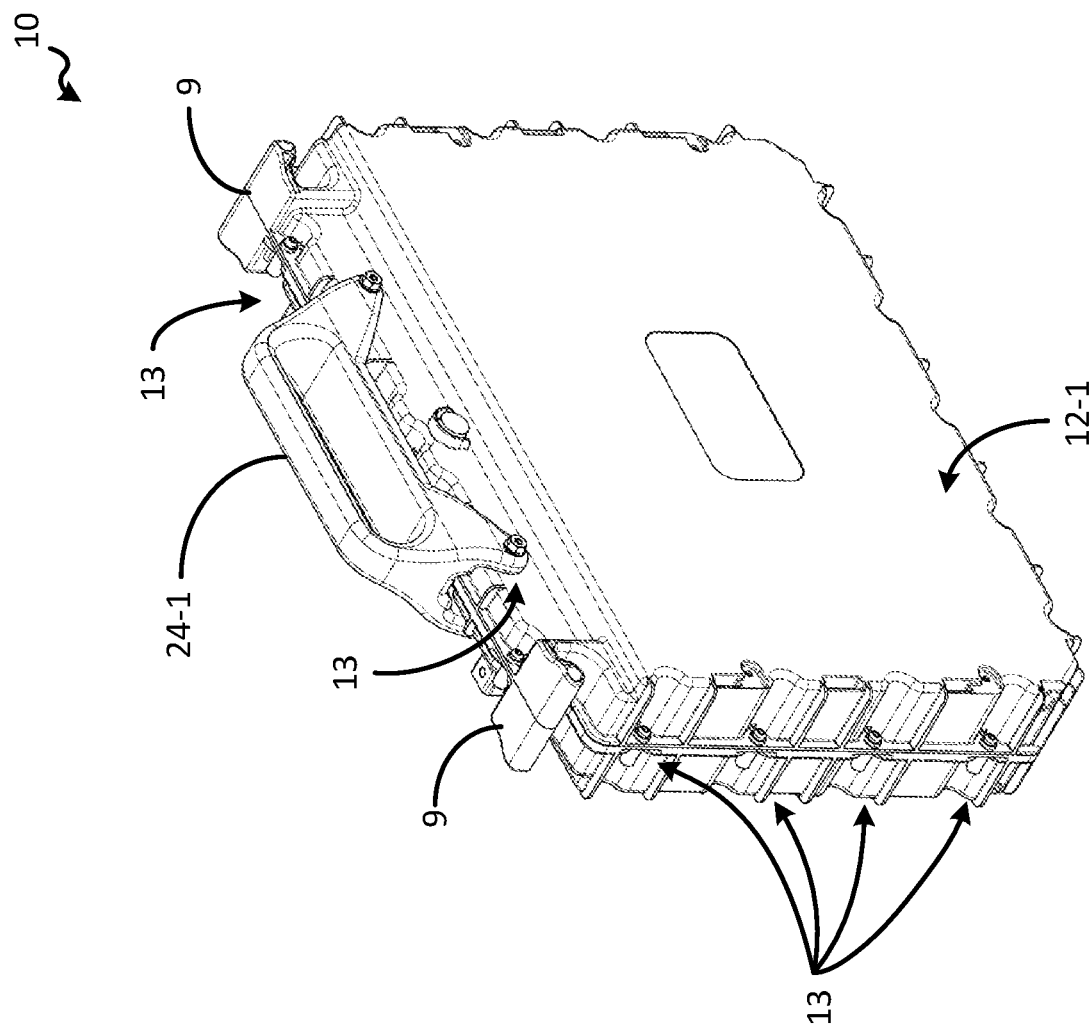
FIG. 2B is an isolated isometric view of a battery pack in accordance with other embodiments of the present disclosure.

FIG. 2B illustrates a battery pack 10 in accordance with other embodiments of the present disclosure. The battery pack 10 of FIG. 2B may include a pack housing 12-1 that differs slightly from the pack housing 12 of FIG. 2A. For example, the battery pack housing 12-1 may define or otherwise include integral handles 9 to assist with lifting or manipulation of the battery pack (such handles also being visible in FIG. 1). Further, for example, the pack housing 12-1 may include attachment points 13. The attachment points 13 may host mounting accessories 21 (see FIG. 1i). The mounting accessories 21 may be received by corresponding mounting surfaces or connectors of the host system. For instance, the mounting accessories 21 may be configured to engage the rail channel 19 (see FIGS. 1A and 1B) on the host system. The mounting accessories 21 may be configured to prevent movement of the battery pack 10 in directions other than the direction of insertion into and removal from the rail channel 19. The attachment points 13 may further host carry handle 24-1.

While the pack housing 12-1 may differ in other ways from the housing 12 (e.g., location of terminals 14 and 16), such differences do not affect battery pack operation/functionality. As a result, references herein to "battery pack 10" and "pack housing 12" are understood to refer to either or both of the embodiments of FIGS. 2A and 2B.

Core Pack

Figure 3:
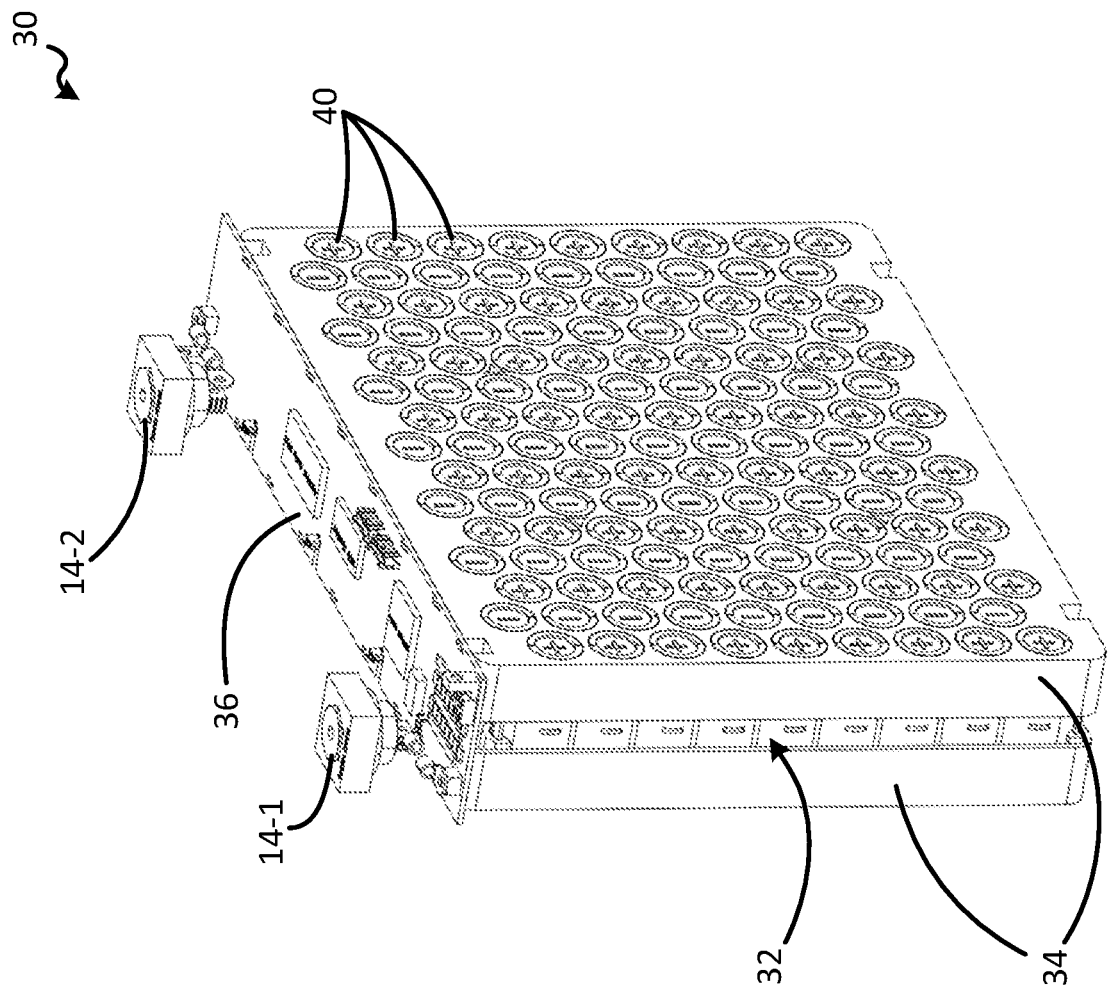
FIG. 3 is an isometric view of an exemplary battery pack with a housing of the battery pack removed to illustrate a core pack in accordance with embodiments of the present disclosure.
Figure 4:
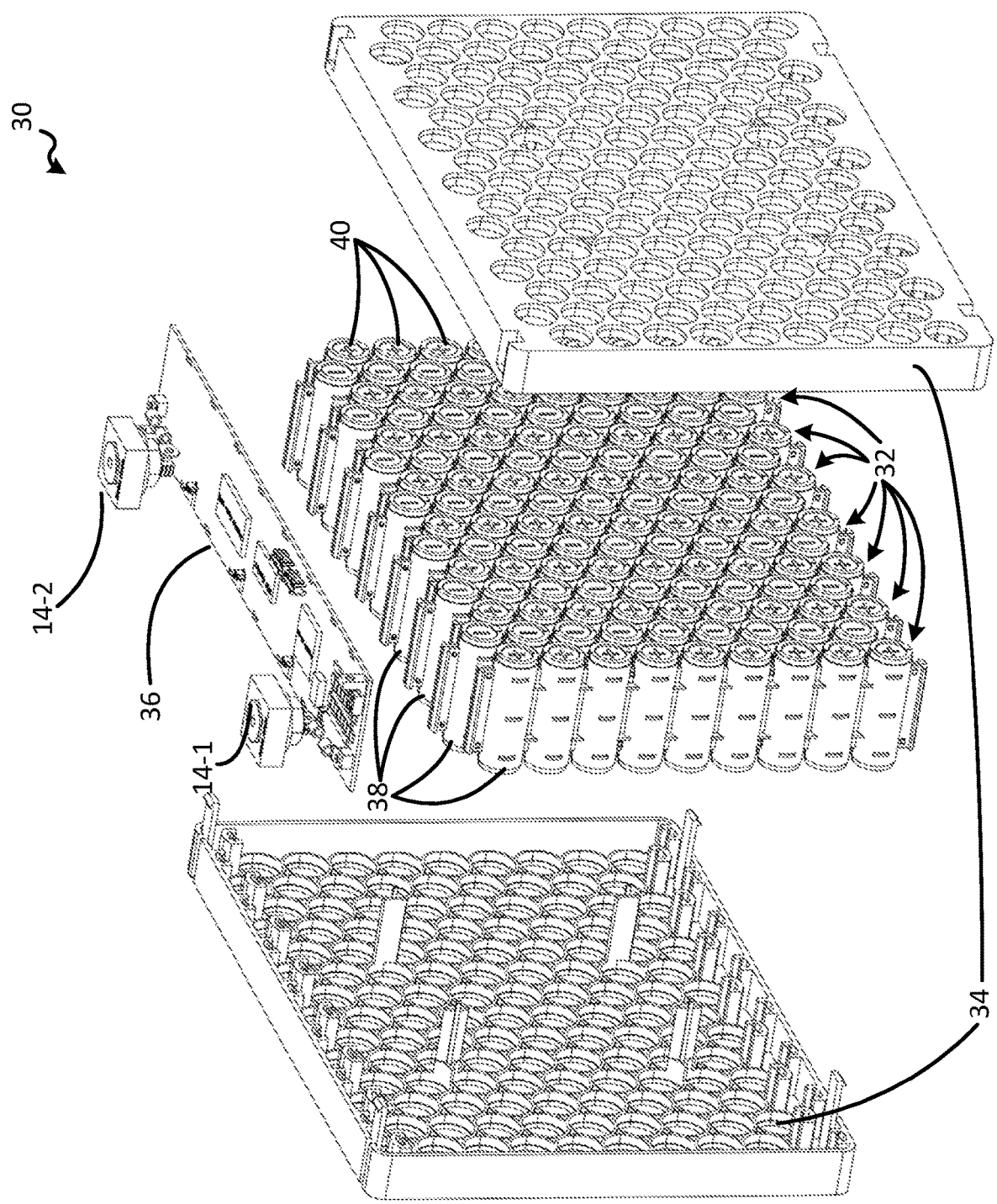
FIG. 4 is an exploded view of the core pack of FIG. 3.

FIGS. 3 and 4 illustrate views of an exemplary core pack 30. The core pack is normally contained within the housing 12, the latter not illustrated in these figures. More particularly, FIG. 3 is an isometric view of the core pack 30, while FIG. 4 is an exploded view. As shown in these views, the core pack 30 may include the power terminals 14-1, 14-2, one or more battery cell magazines 32, a cell carrier 34, and a battery management system 36.

Figure 5:
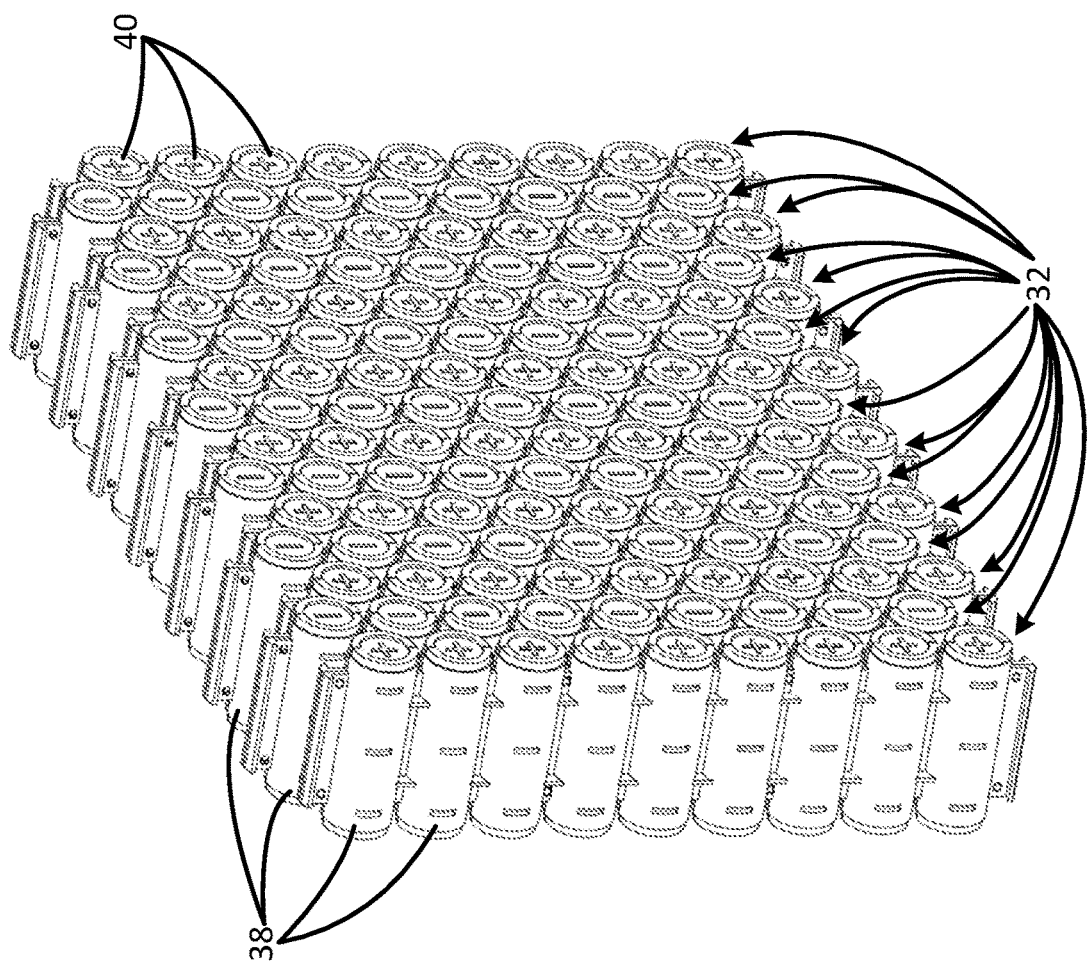
FIG. 5 is an isometric view of battery cell magazines of the battery pack of FIG. 3.

As shown in FIG. 5, each of the battery cell magazines 32 may include a magazine housing 38 and corresponding battery cells 40. The magazine housing 38 may be formed of a material with a high volumetric heat capacity such as, for example, high density polyethylene (HDPE), aluminum, thermally conductive plastic mixtures, acrylonitrile butadiene styrene (ABS), polycarbonate (PC), polyamide 66 with 30 percent glass fiber content, etc. The volumetric heat capacities of some materials are shown in the table of FIG. 14 and described below.

Each magazine housing 38 may define a plurality of cell recesses, wherein each cell recess is configured to receive a battery cell 40 therein. Moreover, as further described below, each of the plurality of cell recesses may define an inner surface configured to be in direct contact with at least 50 percent of a surface area of the sidewalls of the battery cell received therein. Each magazine housing 38 may be arranged to provide an electrically insulative barrier between an anode and a cathode of the battery cells 40 associated with each cell recess and between each battery cell.

Figure 12A:
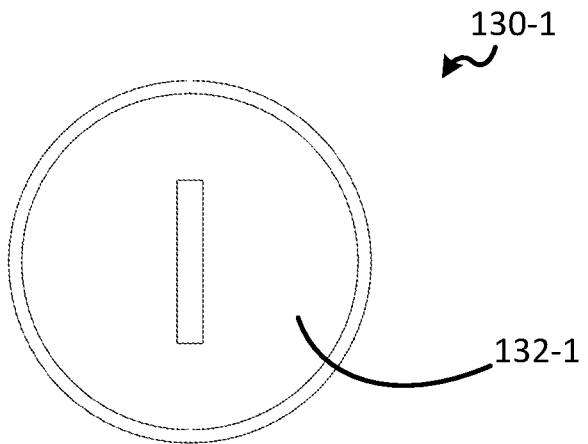
FIG. 12A is an end view of a first base surface of an exemplary cylindrical battery cell in accordance with embodiments of this disclosure.
Figure 12B:
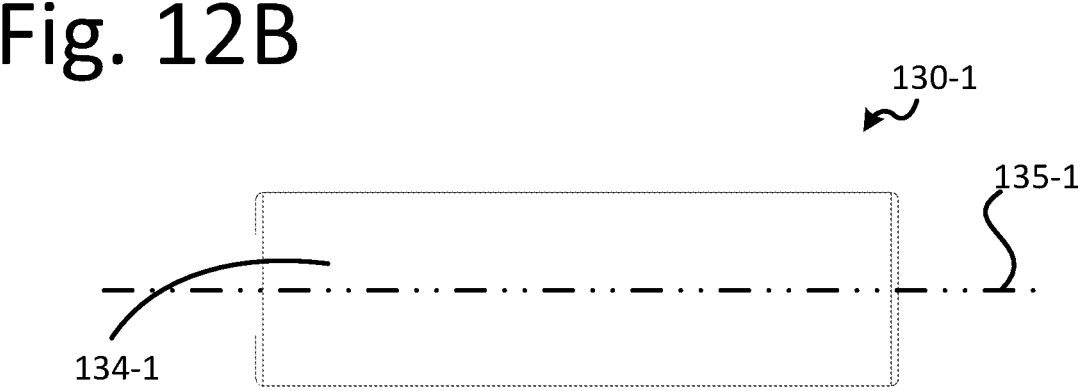
FIG. 12B is a plan view of a sidewall of the cylindrical battery cell of FIG. 12A.
Figure 12C:
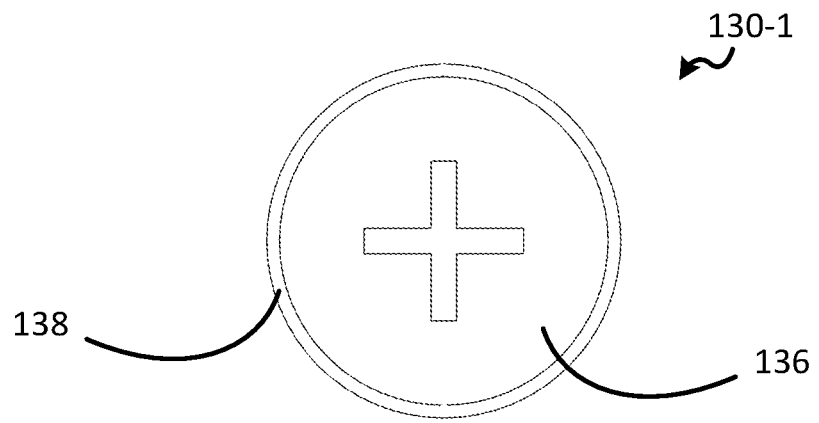
FIG. 12C is an end view of a second base surface of the cylindrical battery cell of FIGS. 12A and 12B.

The battery cells 40 may include any suitable battery type or geometry such as, e.g., cylindrical, prismatic, pouch, etc. For example, the battery cells 40 may each have a generally cylindrical shape as depicted in FIGS. 12A-12C (e.g., battery cell 130-1). Alternatively, the battery cells 40 may take on any prismatic geometry such as, e.g., those depicted in FIGS. 13A-13C (e.g., battery cells 130-2, 130-3, 130-4). Each of the battery cells 40 may have a first base surface 132 (e.g., 132-1), a second base surface 136, and a body defined by one or more sidewalls 134 (e.g., 134-1). Each sidewall 134 may extend between the first base surface 132 and the second base surface 136. The one or more sidewalls 134 may define a surface area.

Battery Cell Magazine

FIG. 5 further illustrates an isometric view of multiple battery cell magazines 32 of the exemplary battery pack 10, wherein each magazine housing 38 is shown containing battery cells 40.

Due to manufacturing tolerances, battery cells (e.g., battery cells 40) can vary somewhat in size from unit to unit. While these variations are acceptable in many applications, it is desirable in aspects of the present application to ensure contact of the sidewalls of the battery cells with corresponding inner surfaces of the cell recesses of the magazine housing 38. A slight interference between the sidewalls of the battery cells and the corresponding inner surfaces of the magazine housing 38 may reduce thermal resistance across the cell magazine housing interface. The efficiency of thermal transfer between the magazine housing 38 and the battery cells can be further increased by increasing the percentage of surface area of the battery cells that contact the inner surface of the cell recesses of the magazine housing 38. That is, a greater percentage of surface area contact increases the amount of heat that can be transferred to and stored by the magazine housing 38. In various embodiments, each magazine housing 38 can have the ability to deflect or otherwise flex to accommodate manufacturing variability in size of the battery cells while ensuring desirable contact between the battery cells 40 and the magazine housing 38.

Figure 6:
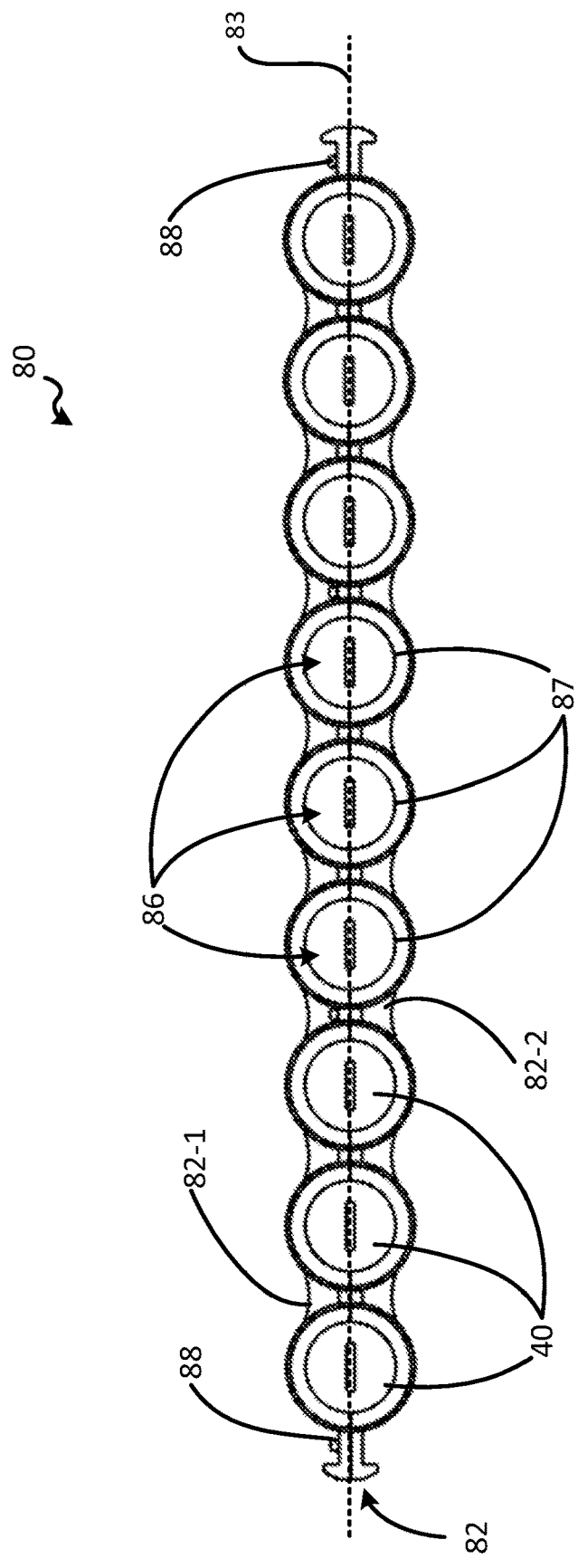
FIG. 6 is a side view of a single battery cell magazine in accordance with embodiments of the present disclosure.
Figure 7:
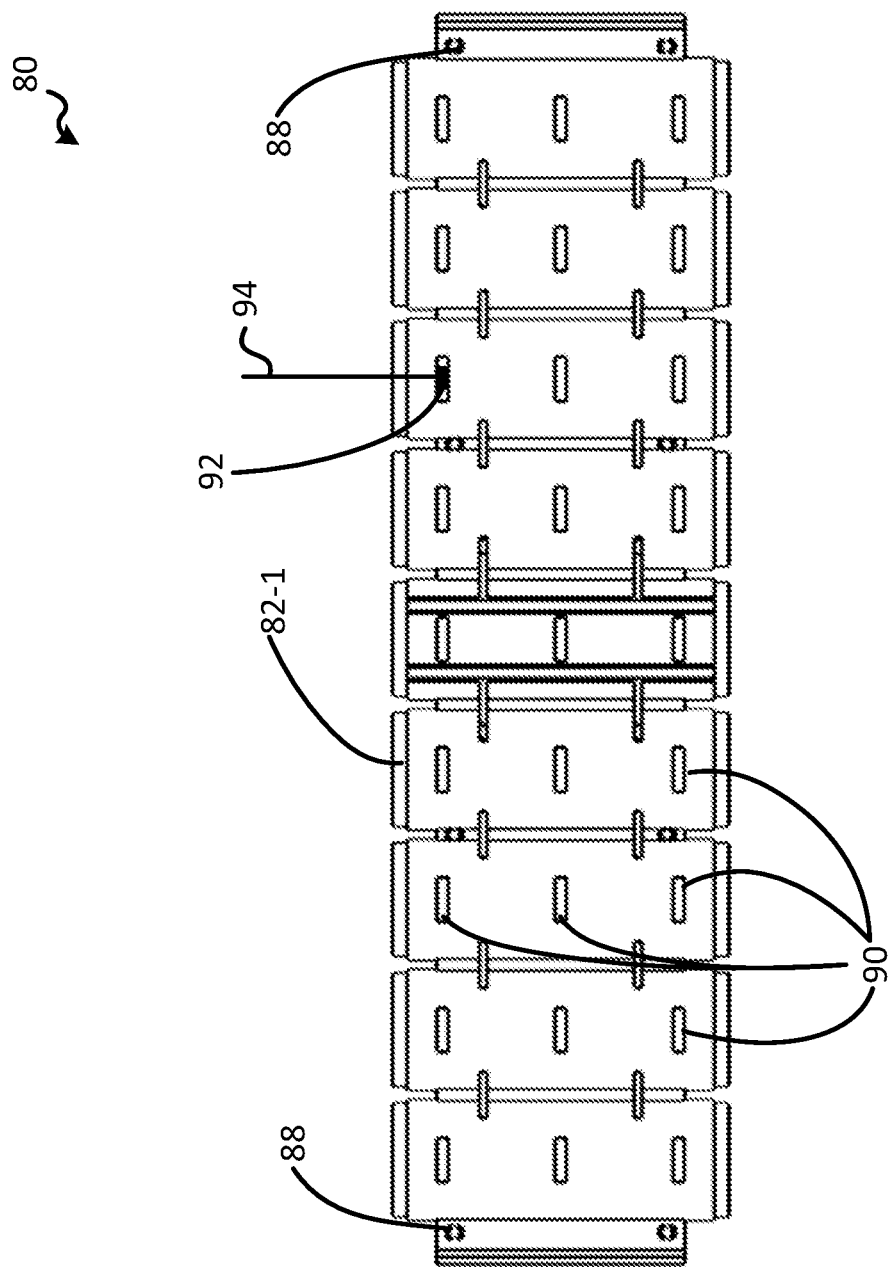
FIG. 7 is a plan view of the battery cell magazine of FIG. 6.
Figure 8:
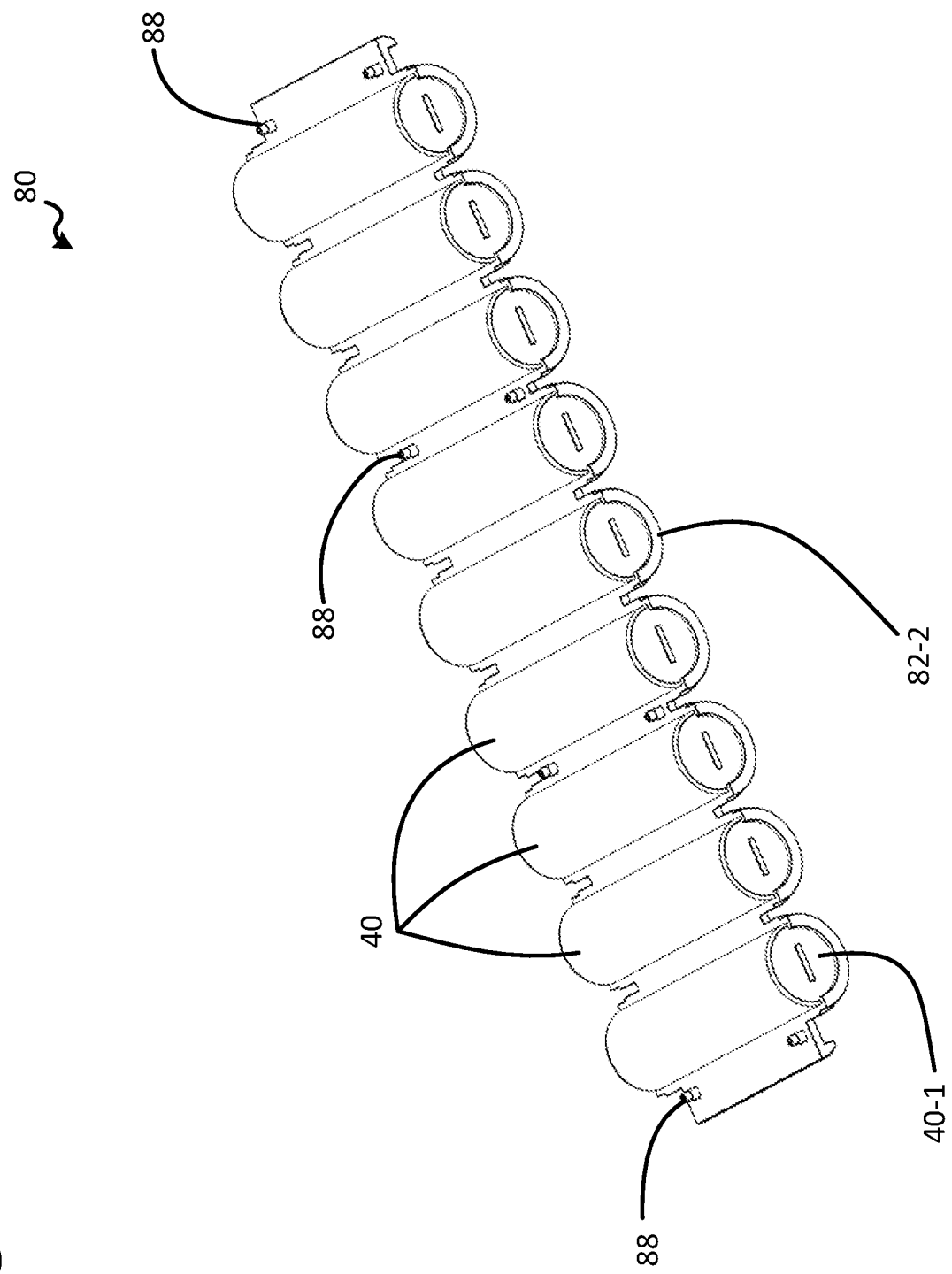
FIG. 8 is an isometric view of an exemplary battery cell magazine with a segment of a magazine housing removed.

FIGS. 6-8 provide various views of an exemplary battery cell magazine 80 including a magazine housing 82 and battery cells 40. More specifically, FIG. 6 is a side elevation view of the battery cell magazine 80, FIG. 7 is a top plan view, and FIG. 8 is an isometric view with a segment 82-1 of the magazine housing 82 removed.

As shown, the exemplary magazine housing 82 may include first and second segments 82-1 and 82-2, wherein each segment forms a portion of the inner surface of the one or more cell recesses 86 and one or more retainers 88. As shown, the battery cells 40 are each received in corresponding cell recesses 86 formed by the segments. The segments 82-1 and 82-2 may be opposed along longitudinal plane 83 of the magazine housing 82. In other words, the segments 82-1 and 82-2 may come together or interface along the longitudinal plane 83 of the magazine housing 82.

In general, the retainers may be configured to secure the first and second segments relative to the battery cells. For example, the segments 82-1 and 82-2 may be secured to one another using the retainers 88. The retainers 88 may include any suitable mechanism or apparatus for securing the segments 82-1 and 82-2 together such as, for example, fasteners, clips, snap-fit features, etc. In some embodiments, the retainers 88 may be integrally formed with the segments 82-1, 82-2.

In some embodiments, the magazine housing 82 may further include one or more apertures or windows 87, 90. Each window 87, 90 may extend through the housing, e.g., extend from an outer surface through to one of the cell recesses 86. In other words, a battery cell received in one of the cell recesses 86 may be exposed or accessed via one of windows 87, 90. The windows 87 may include a first set of windows that expose a portion of a first base surface of each of the battery cells 40 of the battery cell magazine 80 and a second set of windows (opposite the first set of windows) that expose a portion of a second base surface of each of the battery cells 40 of the magazine 80. The windows 90 may expose a portion of a sidewall of one or more of the battery cells 40.

The windows 90 may allow devices, e.g., a thermistor or other temperature sensor 92, to be placed on or near a surface of a corresponding battery cell 40 contained within the magazine housing 82. In one example, the windows 90 are positioned such that temperature sensor 92 can be coupled to a sidewall of the associated battery cell 40. The temperature sensor 92 may include wires or leads 94 to operatively couple the temperature sensor to a BMS or other controller. Alternatively, the sensor may communicate wirelessly with the BMS.

The magazine housing 82 may be formed of any suitable material that is electrically insulative. That is, the magazine housing 82 may provide an insulative barrier between an anode and a cathode of each of the battery cells 40. In some embodiments, the magazine housing 82 may receive bare battery cells (e.g., battery cells 130-1, 130-2, 130-3, 130-4 of FIGS. 12A-12C and 13A-13C). In other words, the magazine housing 82 may receive battery cells that do not have shrink wrap or other insulative components such as washers. In addition to providing electrical insulation, the magazine housing 82 may also be formed of a material having a high thermal energy storage capacity, e.g., a volumetric heat capacity of at least 1000 kilojoules/degree Kelvin·meter$^3$ (kJ/K·m$^3$). Accordingly, the magazine housing 82 may act as a heatsink for the battery cells 40. The magazine housing 82 may provide a barrier to thermal runaway by providing an insulative barrier between battery cells. Thermal runaway may describe a process that is accelerated by increased temperature, in turn releasing energy that further increases temperature. For example, the magazine housing 82 may inhibit heat and gas from a failed battery cell from reaching other battery cells of the battery pack and causing the other battery cells to fail in a cascading fashion.

As shown in FIG. 8, segment 82-1 of the magazine housing 82 has been removed exposing side walls of the battery cells 40. As evident in this view, the magazine housing 82 may extend over a portion of the base surfaces such as base surface 40-1 (see also base surface 132-1 of FIG. 12A) of each of the battery cells 40. Extending over a portion of the base surfaces may provide an insulative barrier between an anode and a cathode of each of the battery cells 40.

Figure 9:
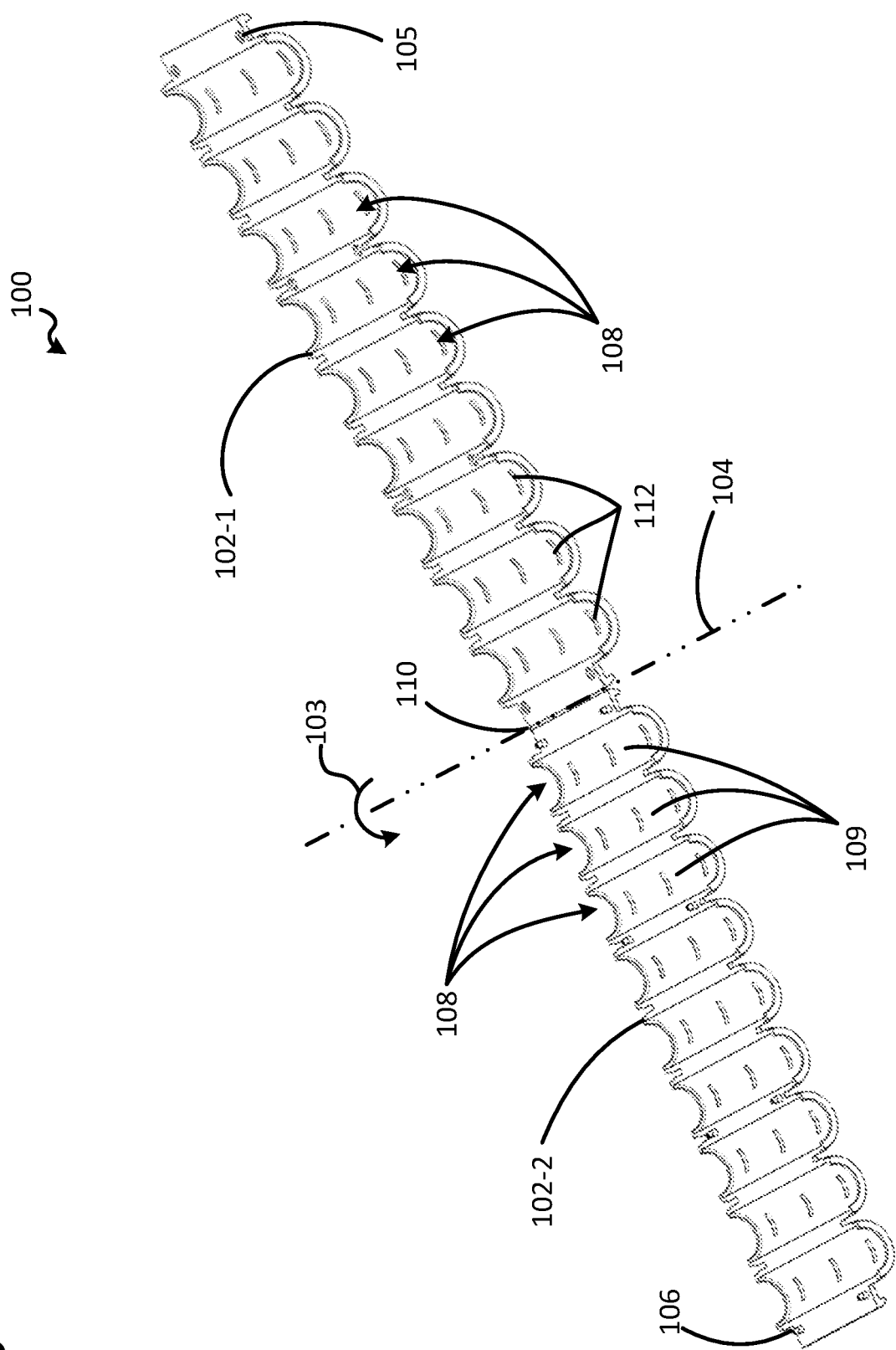
FIG. 9 is an isometric view of a magazine housing shown in an open position in accordance with embodiments of this disclosure.

FIG. 9 illustrates an isometric view of a magazine housing 100 in accordance with alternative embodiments of the present disclosure, the housing shown in an open position. As shown in this view, the magazine housing 100 includes segments 102-1 and 102-2 coupled by a living hinge 110. In other words, the segments 102-1 and 102-2 may be arranged in a clamshell design. The living hinge 110 may allow the segments 102-1 and 102-2 to move between the open position (shown in FIG. 9) and a closed position (not shown) by pivoting about an axis 104 of the living hinge in the direction 103. The segments 102-1 and 102-2 may be secured in the closed position using retainers (e.g., pegs 106 received in apertures 105 with an interference fit).

As with the magazine housing 82, the magazine housing 100 (e.g., segments 102-1, 102-2) defines a plurality of cell recesses 108. Each of the cell recesses 108 may also define an inner surface 109, wherein each segment 102-1 and 102-2 defines portions of each of the inner surfaces 109. That is to say, the "inner surface" of each cell recess is defined by portions of both segments 102-1 and 102-2. The inner surfaces 109 may again be configured to be in direct contact (e.g., interference fit) with at least 50 percent of the surface area defined by the sidewalls of the associated battery cells when assembled into a battery cell magazine. In alternative examples, the inner surfaces 109 of the cell recesses 108 can be configured to be in direct contact with between 50 percent and 95 percent of the surface area defined by the sidewalls of received battery cells. For example, the inner surfaces 109 (of both segments) can be configured to be in direct contact with at least 60 percent of the surface area defined by the sidewall(s) of a battery cell, at least 70 percent of the surface area defined by the sidewall(s) of a battery cell, at least 75 percent of the surface area defined by the sidewall(s) of a battery cell, at least 80 percent of the surface area defined by the sidewall(s) of a battery cell, at least 85 percent of the surface area defined by the sidewall(s) of a battery cell, at least 90 percent of the surface area defined by the sidewall(s) of a battery cell, at least 95 percent of the surface area defined by the sidewall(s) of a battery cell, or any other range between 50 percent and 100 percent of the surface area defined by the sidewall(s) of a battery cell. The magazine housing 100 may further include windows 112 similar to the windows 90 already described herein.

Figure 10:
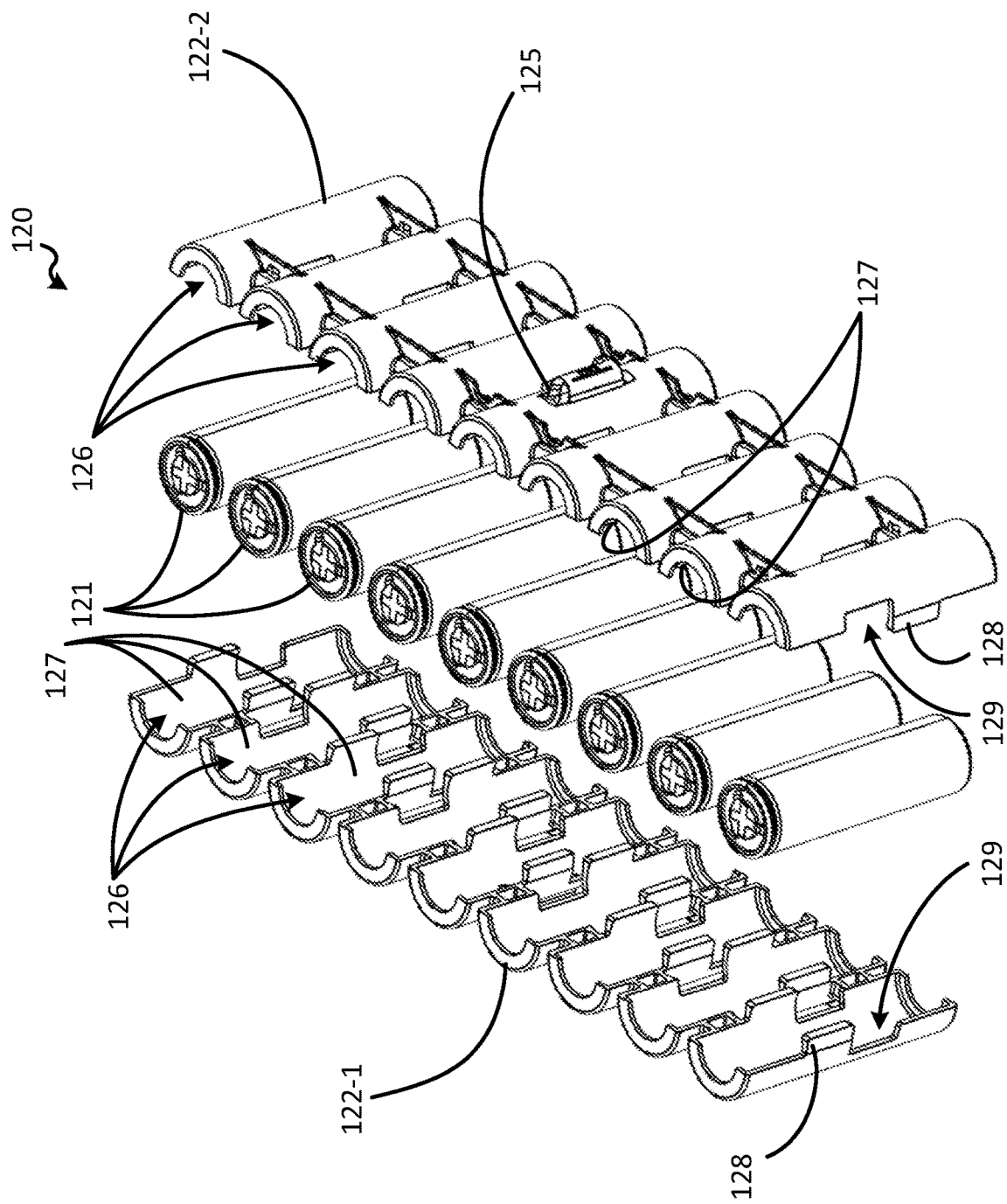
FIG. 10 is an exploded view of a battery cell magazine in accordance with other embodiments of the present disclosure.
Figure 11:
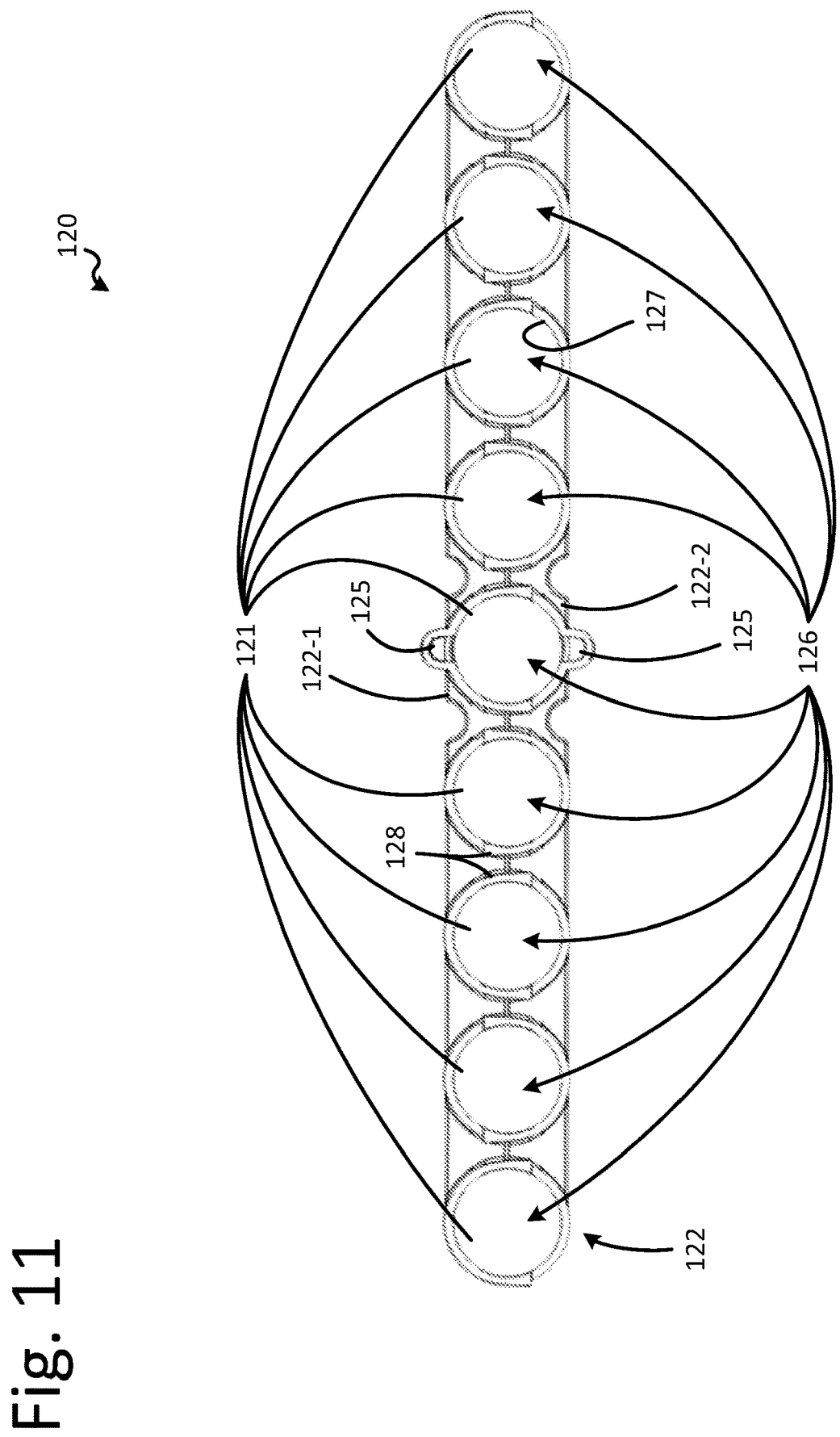
FIG. 11 is a cross-sectional view of the assembled battery cell magazine of FIG. 10 taken normal to a longitudinal axis of battery cells of the magazine.

FIGS. 10 and 11 illustrate a battery cell magazine 120 in accordance with still other embodiments of the present disclosure. Specifically, FIG. 10 illustrates an exploded isometric view of the battery cell magazine 120, while FIG. 11 illustrates a partial cross-sectional view of the assembled battery cell magazine 120. As shown, the battery cell magazine 120 includes a magazine housing formed by first and second opposing segments 122-1 and 122-2 (individually and collectively referred to as segment(s) 122), and one or more battery cells 121. The segments 122-1 and 122-2 may, in some embodiments, be identical.

The magazine housing may include any of the materials and associated features described herein with regard to magazine housings 38, 82, and 100. Moreover, the magazine housing (e.g., the assembled segments 122-1, 122-2) may define one or more cell recesses 126. Each of the segments 122-1, 122-2 may form a portion of each of the cell recesses 126. Each of the plurality of cell recesses 126 may be configured to receive one of the battery cells 121. Each of the plurality of cell recesses 126 may define an inner surface 127 configured to be in direct contact with at least 50 percent of the surface area defined by sidewall(s) of the received battery cell, or any of the alternative ranges provided above with regard to the magazine housing 100 of FIG. 9.

The segments 122 may incorporate retainers 128. Unlike the retainers 88 described above, the retainers 128 may releasably retain each segment to the battery cells received within the segment's portions of the respective cell recesses 126. That is to say, the first and second segments 122-1, 122-2 each include a plurality of retainers 128, wherein the plurality of retainers of the first segment 122-1 releasably retain each received battery cell of the plurality of battery cells 121 relative to the first segment, and the plurality of retainers of the second segment releasably retain each received battery cell of the plurality of battery cells relative to the second segment. Thus, as the retainers 128 may each releasably secure the segments 122-1 and 122-2 to the battery cells, the retainers may releasably secure the segments relative to one another (when battery cells 121 are positioned within the cell recesses 126). As shown, the retainers 128 of each segment 122 may be adapted to snap-fit over the cells received in each of the cell recesses. As used herein, "snap-fit" refers to the joining of first and second parts by elastically deflecting or displacing a first feature on the first part to permit a corresponding second feature on the second part to pass, after which the bias applied by the deflection of the first feature causes it to return towards its undeflected position and retain the second feature. For instance, in the embodiments illustrated in FIGS. 10 and 11, the retainers 128 are formed by protruding portions or "ears" of the inner surface 127 of each cell recess 126 (on each segment 122-1, 122-2). These ears may extend (see FIG. 11) such that each cell recess of each segment has a portion that wraps circumferentially more than 180 degrees about an axis of the received cell. As shown in FIG. 10, each cell recess formed by each segment may also include a cutout 129 that receives therein the ear of the opposing segment to permit the segments to nest relative to each other as the two segments are assembled with the cells.

The retainers 128 may thus be configured to deflect outwardly as a battery cell is placed into a portion of associated cell recess and be biased back toward an undeflected position when the battery cell is seated or received in the cell recess. The retainers 128 may similarly expand outwardly during removal of a battery cell. Stated alternatively, the retainers 128 may releasably retain each of the battery cells 121. The retainers 128 of an opposing segment (e.g., segment 122-2) may similarly deflect and ultimately return toward the undeflected position when a segment containing battery cells (e.g., segment 122-1) is combined with the opposing segment (e.g., segment 122-2). Ultimately, each segment may be secured to the battery cells using the retainers 128 to produce a unitary magazine comprised of two segments and the corresponding battery cells.

In some embodiments, the magazine housing 122 may further include one or more apertures or windows 125. Each window 125 may extend through the housing, e.g., from an outer surface through to one of the cell recesses 126. In other words, a battery cell received in one of the cell recesses 126 may be accessed via one of windows 125. The windows 125 may allow devices, e.g., a thermistor or other temperature sensor, to be placed on or near a surface of a corresponding battery cell 121 contained within the magazine housing 122. In one example, the windows 125 are positioned such that a temperature sensor can be placed on a sidewall of the associated battery cell 121. The magazine housing may further include first and second sets of windows for accessing the base surfaces of the battery cells.

Battery Cell

Figure 13A:
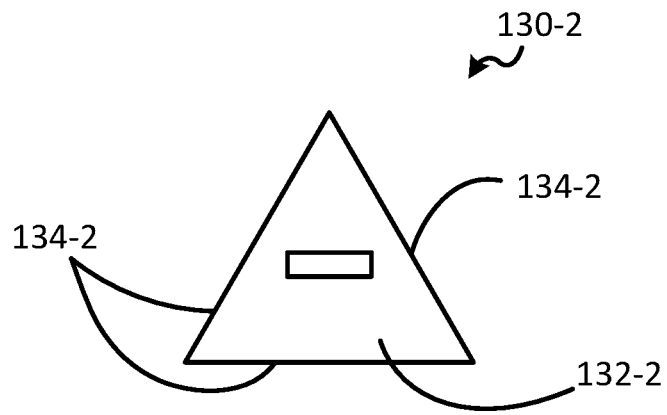
FIG. 13A is an end view of an exemplary prismatic battery cell in accordance with embodiments of this disclosure.
Figure 13B:
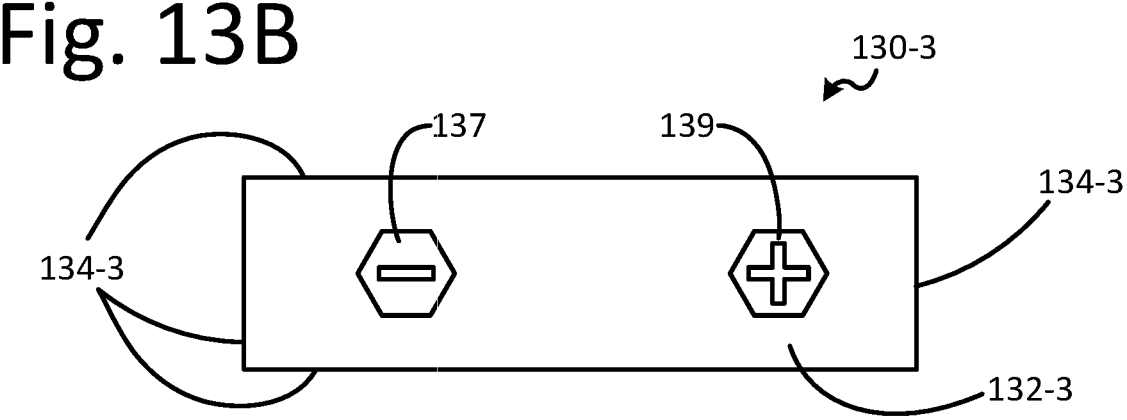
FIG. 13B is an end view of another exemplary prismatic battery cell in accordance with embodiments of this disclosure.
Figure 13C:
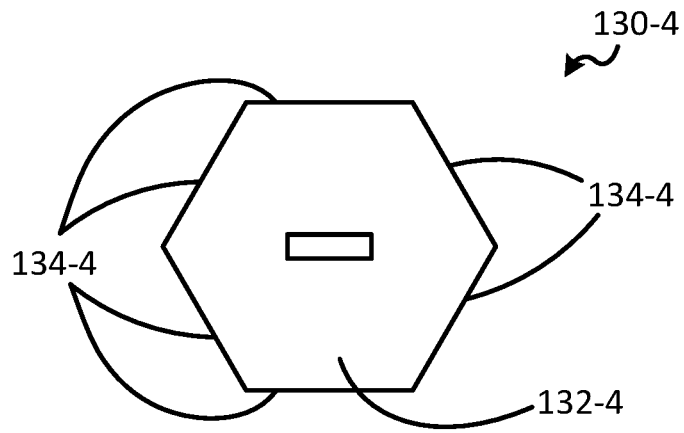
FIG. 13C is an end view of another exemplary prismatic battery cell in accordance with embodiments of this disclosure.

FIGS. 12A-12C illustrate a cylindrical battery cell 130-1 (which may be similar or identical to the cells 40, 121 described above). More specifically, FIG. 12A is an end view of a base surface 132-1 of the cylindrical battery cell 130-1, FIG. 12B is a plan view of a body of the battery cell defined by a sidewall 134-1 of the cell, and FIG. 12C is an end view of base surface 136. FIGS. 13A-13C illustrate end views of base surfaces 132-2, 132-3, and 132-4 of prismatic battery cells 130-2, 130-3, and 130-4 respectively. The battery cells 130-1, 130-2, 130-3, and 130-4 may be referred to individually or collectively as battery cells 130. The base surfaces 132-1, 132-2, 132-3, and 132-4 may be referred to individually or collectively as base surfaces 132. The sidewalls 134-1, 134-2, 134-3, and 134-4 may be referred to individually or collectively as sidewalls 134.

As used herein, the term "prismatic battery cells" may refer to battery cells with a prismatic geometry. A prismatic geometry may refer to a polyhedron comprising an n-sided polygonal base (e.g., base surface 132), a second base (e.g., base surface 136) that is a translated copy (e.g., rigidly moved without rotation) of the n-sided polygonal base, and n other faces (e.g., sidewalls 134) joining corresponding sides of the two bases. All cross-sections of the prismatic battery cells parallel to the bases may be translations of the bases.

The sidewall 134-1 of cylindrical battery cell 130-1 defines a curved surface (which may define a mostly cylindrical shape) that extends between the base surface 132-1 and the base surface 136 along a longitudinal axis 135-1. The sidewall 134-1 may further define an exterior cell wall surface area. In the illustrated embodiments, the base surface 132-1 may include or otherwise form an anode of the cylindrical battery cell 130-1, which may extend along at least a portion of the curved sidewall 134-1. Similarly, the base surface 136 may include a cathode of the cylindrical battery cell 130-1. The cylindrical battery cell 130-1 may define a gap 138 that forms a space between the anode and cathode of the cylindrical battery cell. As shown in FIG. 12C, the gap 138 is located on or relative to the base surface 136 but may be located on any of the surfaces of the cylindrical battery cell 130-1. Magazine housings, as described herein, may partially or entirely cover the gap 138 when the cylindrical battery cell 130 is received therein providing an insulative barrier between the anode and cathode of the cylindrical battery cell. Such coverage of the gap 138 may provide an insulative barrier between the anode and cathode of the cylindrical battery cell without using a washer, shrink wrap, or other additional materials.

Alternatively, for example, the battery cells 130 (see, e.g., cell 130-3) may include positive and negative terminals 139, 137, respectively, that correspond to the cathode and anode of the battery cell. In this example, the base surfaces 132, 136 may not form an anode or cathode of the cylindrical battery cell 130. For example, as shown in FIG. 13B, the positive terminal 139 and the negative terminal 137 are disposed on the base surface 132-3. The positive and negative terminals 139, 137 may be disposed on any of the surfaces (e.g., base surfaces 132, 136 or sidewalls 134) of the battery cell 130.

FIG. 13A depicts a triangular base surface 132-2 of the prismatic battery cell 130-2, FIG. 13B depicts a rectangular base surface 132-3 of the prismatic battery cell 130-3, and FIG. 13C depicts a hexagonal base surface 132-4 of the prismatic battery cell 130-4. The base surfaces 132 of battery cells may take on any curved (e.g., circular, elliptical, etc.) or polygonal shape (e.g., triangular, rectangular, square, pentagonal, hexagonal, etc.). Furthermore, the number of sidewalls 134 of a battery cell may correspond to the number of sides of the base surface 132. For example, cylindrical battery cell 130-1 includes a single sidewall 134-1, prismatic battery cell 130-2 includes three sidewalls 134-2, prismatic battery cell 130-3 includes four sidewalls 134-3, and prismatic battery cell 130-4 includes six sidewalls 134-4.

The battery cells 130 may be of most any chemistry. For example, the battery may have a lithium-based chemistry (e.g., lithium ion), In other embodiments, nickel-metal-hydride, nickel-cadmium, or most any chemistry now known or later developed may be utilized.

FIG. 14 is a table showing various thermal properties for a variety of different materials, some of which may be used to construct the magazine housings as described herein. Such materials include: high density polyethylene (HDPE), aluminum, a thermally conductive plastic mixture, acrylonitrile butadiene styrene (ABS), polycarbonate (PC), polyamide 66 with 30 percent glass fiber content (commercially available as TECAMID® 66 GF30 from Ensinger Plastics of Washington, Pennsylvania, USA), and air. Thermally conductive plastic mixtures are plastics that are modified to increase thermal conductivity. For example, additives such as ceramics and graphite can be added to a base plastic material to make the mixture thermally conductive. One example of a thermally conductive plastic is D3612 Coolpoly (e.g., D3612 Thermally Conductive Polyamide (PA66/6), available commercially from Celanese Corporation, located in Irving, Texas, USA). Two thermal properties are commonly considered for choosing a thermal storage medium. The first is thermal conductivity, measured in Watts/meter-Kelvin (W/m·K). Thermal conductivity indicates how effective a particular material is at conducting heat through the material. For example, aluminum has a very high thermal conductivity—around 204 W/m·K.

A second thermal property relevant to the performance of heat storage materials is the specific heat capacity of the material. Specific heat capacity refers to the amount of heat energy a material can absorb per unit increase in temperature. Specific heat capacity is mass dependent and is measured in Joules/kilogram·Kelvin (J/kg·K). Some materials require more energy than others to raise the temperature of the material. The specific heat capacity of a material multiplied by its density results in a volumetric representation of how much heat energy is required to change the temperature of the material. This quantity is volumetric heat capacity, which is independent of mass and is measured in $kJ/K \cdot m^3$.

Volumetric heat capacity is a measure of the amount of heat energy that must be added to one unit volume of the material in order to cause an increase of one unit in its temperature. Material volumes with a high volumetric heat capacity change temperature more slowly that materials of equivalent volume with a low volumetric heat capacity when exposed to the same amount of heat. Heat transfer from one material to another is driven by a temperature gradient. If a thermal storage medium has a high volumetric heat capacity, an adjacent battery cell will increase in temperature more quickly than the thermal storage medium material, creating a situation in which the temperature gradient increases continuously, leading to a corresponding increase in heat transfer. In contrast, if a thermal storage medium has a low volumetric heat capacity, an adjacent battery cell may not increase in temperature more quickly than the thermal storage medium.

Referring to FIG. 14, it can be seen that HDPE has a thermal conductivity of less than one W/m·K, and aluminum has a thermal conductivity of around 204 W/m·K. But the two materials have a similar volumetric heat capacity (ability to absorb heat) because the specific heat capacity of HDPE is more than two times the specific heat of aluminum. Aluminum makes up for its deficit in specific heat by having three times the density of HDPE. Therefore, the volumetric heat capacity of aluminum and HDPE are similar. Moreover, HDPE has a relatively low thermal conductivity and a relatively high specific heat capacity compared to aluminum, while also having a lower density, making the HDPE material more lightweight per unit volume.

One limiting factor present in a closed lithium ion battery pack is the thermal resistance of the interface between the heat storage medium (e.g., the magazine segments) and the battery cell walls, i.e., the resistance of heat transfer from a first material to an adjacent second material that is in direct thermal contact with the first material. If thermal resistance is high, the thermal conductivity of the heat storage medium cannot be adequately realized. Thermal resistance is correlated to, among other parameters, the surface roughness of two conforming surfaces in contact with one another, and to the pressure with which the two surfaces contact each other. Two surfaces that are each very smooth and that are pressed together tightly have a lower thermal resistance across the two materials. The thermal resistance between the two materials may present a bottleneck of the heat transfer process in a closed battery.

In some examples, HDPE is selected for its high heat capacity, elasticity, and because it is an inherent dielectric. However, many other thermoplastic polymers can be used in connection with the disclosed technology. Forming a thermal storage device using materials such as thermoplastics, HDPE, ABS, PC, polycarbonate-acrylonitrile butadiene styrene (PC-ABS), polyamide-acrylonitrile butadiene styrene (PA-ABS), and similar materials may not require complicated phase change mixtures or processes, because they are solid materials that do not undergo a phase change in the temperature operating conditions of the battery pack. Additionally, because HDPE and other thermoplastics are inherent dielectrics, they require no extra dielectric layers, tapes, or additives to be used in a battery pack. Other plastic materials and mixtures of plastic materials with other materials may also be used. The term plastic as used herein means any of a wide range of synthetic or semi-synthetic organic compounds that can be molded into solid objects.

In some examples, the battery pack has an operating temperature lower than 75 degrees Celsius (° C.). In some examples, the battery pack has an operating temperature at or below 75° C., 70° C., 65° C., or 60° C. In some examples, the battery has an operating temperature of at least −20° C., at least −15° C., or at least −10° C. In some examples, the battery has an operating temperature between −20° C. and 60° C., or between −20° C. and 75° C.

Battery Management System

Figure 15:
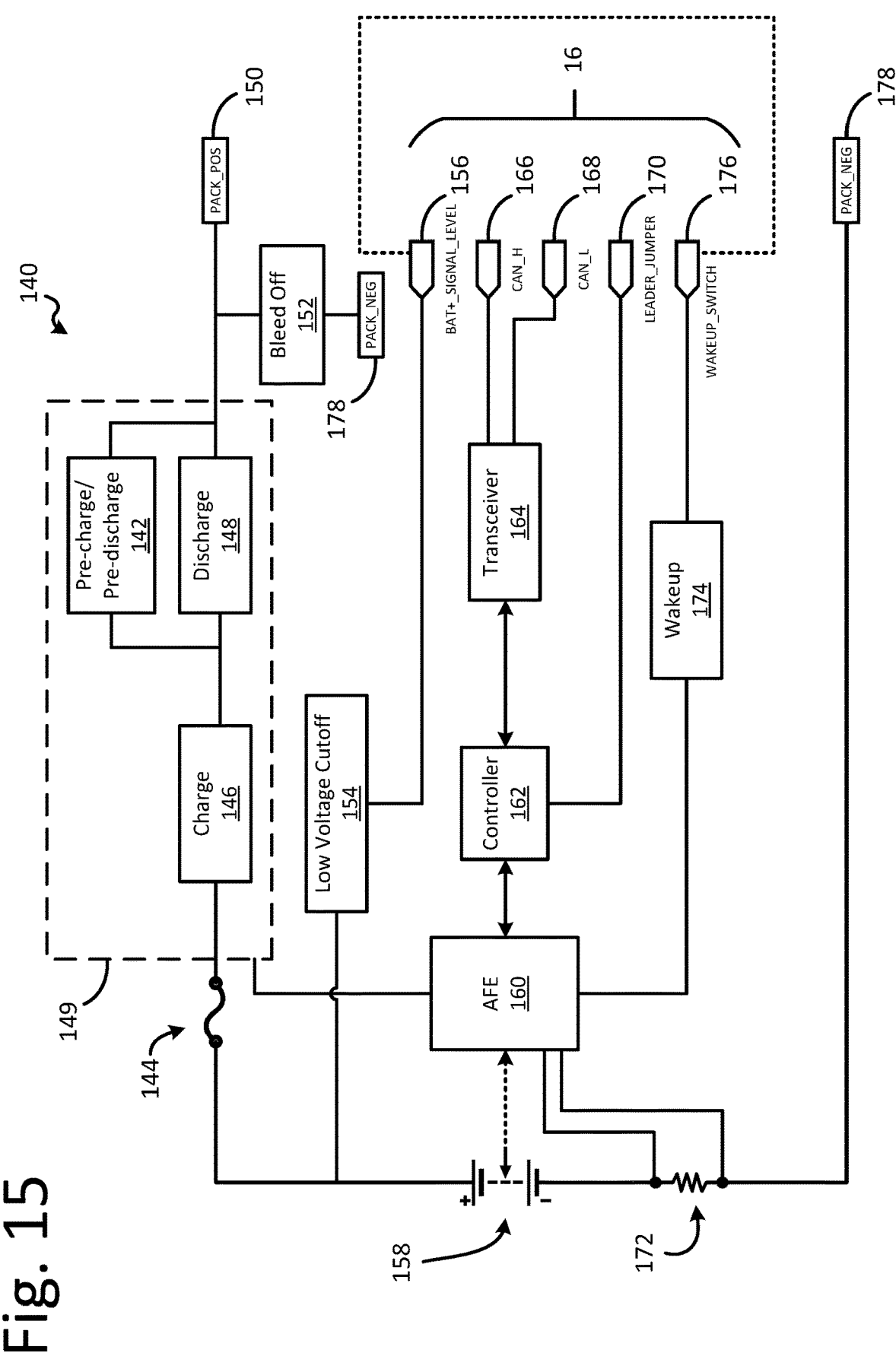
FIG. 15 is a schematic block diagram of a battery management system (BMS) in accordance with embodiments of this disclosure.

FIG. 15 is a schematic block diagram of a BMS 140 in accordance with embodiments of the present disclosure. A BMS such as the BMS 140 may be included in any battery pack described herein (for example, battery pack 10). The BMS 140 may be operatively coupled to battery cells (e.g., any of battery cells 40, 121, 130 as described herein) of a battery pack to control charging and discharging of the battery cells.

Accordingly, the exemplary BMS 140 may include a multicell battery 158. Multicell battery 158 may include battery cells as described herein, for example, battery cells 40, 121, and 130. The multicell battery 158 may have any suitable voltage for power equipment such as, for example, 2.5 volts (V) to 1000 V. In one example, the multicell battery 158 has a nominal voltage of 48 V-60 V. The multicell battery 158 may include taps or terminals for monitoring battery cell voltages. The taps may allow the BMS 140 to monitor individual battery cells or groups of battery cells of the multicell battery 158. Further, the multicell battery 158 may include temperature sensors (e.g., temperature sensor 92 of FIG. 7) as described above for sensing battery cell temperatures. In one example, the temperature sensors are thermistors. The battery cell voltages and battery cell temperatures may be monitored by an analog front end (AFE) battery monitoring circuit 160 of the BMS 140 operatively coupled to the multicell battery 158.

The AFE battery monitoring circuit 160 may be operatively coupled to and control power protection circuitry 149 such as, for example, a pre-charge/pre-discharge circuit 142, a charge circuit 146, and a discharge circuit 148. Moreover, the AFE battery monitoring circuit 160 may monitor voltages and temperatures of battery cells of the multicell battery 158. In some embodiments, the AFE battery monitoring circuit 160 may monitor the cell voltage of each individual battery cell and may monitor battery pack current using a current shunt 172. For example, the AFE battery monitoring circuit 160 may monitor a voltage across the current shunt 172 and determine a current based on the voltage and a resistance of the current shunt. As shown in FIG. 15, the power protection circuitry 149 may be operatively coupled to a positive terminal 150 of the multicell battery 158 to control charging and discharging of the multicell battery.

The BMS 140 may further include a controller 162 adapted to, among other functions, control operation and communication aspects of the BMS 140. For example, the controller 162 may control the states of the BMS 140 and changes between states as described herein below. Further, for example, the controller 162 may control communication over the communication (e.g., CAN) bus. The controller 162 may further monitor a voltage of the multicell battery 158. Additionally, the controller 162 may crosscheck the cell voltage of each individual battery cell monitored by the AFE battery monitoring circuit 160 against the voltage of the multicell battery 158. The controller 162 may include one or more processors for executing instructions and memory (e.g., computer-readable medium) to store data, instructions, programs, etc.

As stated above, the BMS 140 may include the charge circuit 146 and the discharge circuit 148. The charge circuit 146 may be configured to permit or deny charging of the battery pack, while the discharge circuit 148 may be configured to permit or deny discharging of the battery pack. Together, the charge circuit 146 and discharge circuit 148 effectively form a bidirectional switch. The bidirectional switch may include two sets of Field Effect Transistors (FETs). The charge circuit 146 and the discharge circuit 148 may each be operated independently to control charging and discharging of the battery pack. The charge circuit 146 and discharge circuit 148 may allow the battery pack to regulate the flow of current into and out of the battery pack independently. In other words, the battery pack may be able to allow discharging while disallowing charging and to allow charging while disallowing discharging. Furthermore, bidirectional regulation of current flow provided by charge circuit 146 and discharge circuit 148 allows battery packs to be hot swapped and to balance themselves with parallel connected battery packs. In other words, the bidirectional regulation of current flow may allow current flow between battery packs to balance the voltage of the connected battery packs. The charge circuit 146 and discharge circuit 148 may also allow the battery pack to enter self-protection modes (such as over-voltage protection) without removing power from the host system. Accordingly, a diagnostic response may be provided to the operator because the host system still has power.

The BMS 140 may further include the pre-charge/pre-discharge circuit 142 in parallel with the discharge circuit. The pre-charge/pre-discharge circuit 142 may be configured to limit current flow into the battery pack from a charging source such as, for example, a plug-in charger, another battery pack, or an alternator/generator. Furthermore, the pre-charge/pre-discharge circuit 142 may be configured to limit current flow out of the battery pack (into a host system). For instance, the pre-charge/pre-discharge circuit 142 may limit inrush currents caused by capacitive loads that may exist in a motor controller on the host system (see host system 210 in FIG. 16). In one example, the pre-charge/pre-discharge circuit 142 includes a Positive Temperature Coefficient (PTC) thermistor. The PTC thermistor may provide a series resistance to limit inrush current. Additionally, the PTC thermistor may act as a fuse if the system load is too large. The PTC thermistor may protect components of BMS 140 from harm by mismatched system loads.

In some embodiments, the BMS 140 may include a bleed-off circuit 152 adapted to bleed off residual energy that may be stored in a host system's bulk capacitors once the battery is electrically isolated. The bleed-off circuit 152 may decrease the deenergizing time for the host system's power terminals. The bleed-off circuit 152 may be configured to bleed-off residual energy by providing an electrically resistive coupling to the negative terminal 178 of the battery pack.

The BMS may also include a transceiver 164. The transceiver 164 may be operatively couplable to the host device. The transceiver 164 may provide communication with the host device using any suitable protocol such as, for example, CAN protocols. Communication may include transmitting data or receiving data. The transceiver 164 may be controlled by the controller 162.

The BMS 140 may include suitable external electrical interfaces. For example, the BMS 140 may include external electrical interfaces such as PACK_POS (e.g., positive terminal) 150, PACK_NEG (e.g., negative terminal) 178, and communication terminal 16. Communication terminal 16 may include CAN_H 166, CAN_L 168, WAKEUP_SWITCH 176, LEADER_JUMPER 170, and BAT+_SIGNAL_LEVEL 156. The WAKEUP_SWITCH 176 (which may be operatively coupled to a wakeup circuit 174) may provide a wakeup signal to allow the battery pack to be turned on. To activate the WAKEUP_SWITCH 176 (e.g., to provide the wakeup signal) the WAKEUP_SWITCH 176 may be operatively coupled to BAT+_SIGNAL_LEVEL 156. Additionally, the WAKEUP_SWITCH 176 may be configured to provide the wakeup signal in response to a user input.

LEADER_JUMPER 170 may include LEADER_JUMPER_A and LEADER_JUMPER_B (not shown). LEADER_JUMPER_A may be pulled up to 3.3 V. LEADER_JUMPER_B may be coupled to PACK_NEG. Shorting LEADER_JUMPER_A and LEADER_JUMPER_B may designate the battery pack as the battery leader. In one example, coupling LEADER_JUMPER 170 to BAT+_SIGNAL_LEVEL 156 may designate the battery pack as the battery leader.

The BMS 140 may be configured to deenergize the power terminals (150, 178) when the battery pack is disconnected from an authenticated host device for more than a predetermined time period. Connections to an authenticated host may be determined using any suitable communication protocols. The predetermined time period may be, for example, 1 second to 5 seconds. In one example, the predetermined time period is 3 seconds. In another example, a lost connection to an authenticated host is defined as a 3 second timeout of qualified CAN bus handshake sequences. Deenergizing the power terminals when the battery pack is disconnected from an authenticated host device may reduce battery pack misuse.

The BMS 140 may include the low voltage cutoff circuit 154 operatively coupled to the positive terminal 150 of the multicell battery. The low voltage cutoff circuit 154 may provide a current limited power supply (based on a voltage of the multicell battery). As shown in FIG. 15, the current limited power supply may be provided via BAT+_SIGNAL_LEVEL 156. The BMS 140 may include the wakeup circuit 174 operatively coupled to the low voltage cutoff circuit 154 to receive the current limited power supply, and to the AFE battery monitoring circuit 160. The wakeup circuit 174 may allow the AFE battery monitoring circuit 160 and the controller 162 to be put into an off or low power state, which may extend the life of the battery pack. When the wakeup circuit 174 is active (e.g., by activating a wakeup switch (WAKEUP_SWITCH 176)), the wakeup circuit 174 may wake up the battery pack by turning on the AFE battery monitoring circuit 160. The wakeup circuit 174 may be configured to turn on the AFE battery monitoring circuit 160 in response to the wakeup signal when the current limited power supply is provided by the low voltage cutoff circuit 154 (e.g., in response to a charging current being provided to the multicell battery by an external device).

The low voltage cutoff circuit 154 may provide the current limited power supply (based on a voltage of the multicell battery) to the WAKEUP_SWITCH 176 and/or the wakeup circuit 174. The low voltage cutoff circuit 154 may cutoff or decouple the current limited power supply (BAT+_SIGNAL_LEVEL 156) from the multicell battery 158 when the voltage of the multicell battery is at or below a threshold voltage effectively cutting off the power supply to the WAKEUP_SWITCH 176 and/or the wakeup circuit 174. In other words, the wakeup signal may not be provided when the voltage of the multicell battery falls to or below a threshold voltage. Accordingly, the low voltage cutoff circuit 154 may prevent the battery pack from being discharged to an unrecoverable state or voltage. When the low voltage cutoff circuit 154 has been triggered, the battery pack may be turned on by an external power supply. In other words, the battery pack may be woken up when being charged or being connected to a charger.

In some embodiments, the BMS 140 may additionally include a fuse 144 to provide additional current protection. The fuse 144 may be configured to open in the event of a current increase above a predetermined threshold reaching the fuse 144 faster than the AFE battery monitoring circuit 160 can react (e.g., 0.5 milliseconds).

The BMS 140, via the AFE battery monitoring circuit 160, may be configured to monitor operating conditions of the multicell battery 158. The AFE battery monitoring circuit 160 may be operatively coupled to the power protection circuitry 149 to control the power protection circuitry based on the operation conditions of the multicell battery 158. Operating conditions may include, for example, battery cell voltages, battery cell temperatures, charge current, discharge current, multicell battery voltage, multicell battery temperature, etc. The BMS 140 (e.g., the battery monitoring circuit 160) may be configured to determine when unsafe operating conditions of the multicell battery 158 occur. Unsafe operating conditions may include, for example, battery cell or multicell battery voltages above overvoltage thresholds, battery cell or multicell battery voltage below undervoltage thresholds, battery cell or multicell battery temperatures above temperature thresholds, charge current or discharge current above current thresholds, etc. The BMS 140 may be configured to cease charging and discharging of the multicell battery 158 based on one or more unsafe operating conditions of the multicell battery 158. Ceasing charging and discharging may prevent damage or failure of the multicell battery 158.

Battery Stack

FIG. 16 is a block diagram of a battery stack 200 in accordance with embodiments of this disclosure. As used herein, "battery stack" 200 refers to multiple battery packs (e.g., pack 10 as described herein) connected to one another to provide correspondingly greater capacity or voltage. As shown in this view, the battery stack 200 may include a battery leader 202 having a battery pack, and one or more support batteries operatively coupled to the battery leader and in communication therewith, wherein each support battery also includes a battery pack. As shown, the one or more support batteries are indicated by reference numbers 204A-204N and may be referred to separately or collectively as support batteries 204. The battery stack 200 may include the battery leader and any suitable number (N) of support batteries 204. For example, battery stack 200 may include one support battery up to 25 support batteries.

The battery leader 202 may be operatively coupled to the host system 210. The battery leader 202 may communicate with (e.g., transmit data to and receive data from) the host system 210. Additionally, the battery leader may provide power to, and/or receive power from, the host system 210. Additionally, the battery leader 202 may provide power to and/or receive power from the support batteries 204.

The support batteries 204 may be operatively coupled to, and communicate with, one another. The support batteries 204 may be operatively coupled to the host system 210 (e.g., either directly or indirectly via the battery leader). Accordingly, the support batteries 204, like the battery leader, may provide power to, and receive power from, the host system. And like the battery leader, the support batteries may also communicate with the host system 210. In some embodiments, the support batteries may not communicate directly with the host system 210, but rather communicate directly with the battery leader 202 that, in turn, communicates with the host system 210. The BMS of each battery pack may communicate and determine which of the battery packs is the battery leader.

The host system 210 may include any suitable devices to interface with the battery stack 200 such as, for example, controllers, data buses, receivers, transmitters, etc.

Each of the battery leader 202 and support batteries 204 may be removed from the battery stack 200. For example, a battery pack may be removed from the battery stack 200 by decoupling the battery pack from the other battery packs of the battery stack 200. Additional battery packs may be added to the battery stack by operatively coupling the battery pack to the battery stack. If a battery leader 202 is already designated or otherwise selected, the newly added battery pack may be designated as a support battery. Moreover, as described above, the battery stack 200 may be operatively coupled to a host system 210 and provide power to and/or receive power from the host system 210. As one can appreciate, the battery packs of the battery stack 200 may be operatively coupled to one another and be regulated by the battery leader 202 without being directly coupled to the host system 210.

In one example, the battery leader 202 may be configured to control charging between the battery packs of the battery stack, and/or classify each of the one or more support batteries 204 as an active usage battery pack or a pending usage battery pack. For example, the battery leader 202 may be configured to classify a support battery of the one or more support batteries 204 as a pending usage battery pack if the support battery has an active fault. The BMS of the battery leader 202 may also be configured to provide a cease command signal to the BMS of each pending usage battery pack to, for example, cease charging and discharging (e.g., provide power).

Each battery pack may support autonomous dynamic Node ID assignment. This may allow the battery packs of the battery stack 200 to be quickly swapped without requiring additional user input at the host system 210 or another user terminal. Dynamic Node ID assignment may allow the battery leader 202 to be selected based on a hardware jumper or switch 170 (e.g., LEADER_JUMPER 170 of FIG. 15). In other words, the battery leader 202 may be selected based on a hardware jumper connection that can be shorted, or via a switch, by a user. The battery leader 202 may compile all data bus traffic from the support batteries 204 and convey a consolidated set of "Battery Pack Stack" messages to the host system 210. Battery messages outside of the Battery Pack Stack message may be isolated from the host system's data bus. Isolation of messages outside of the Battery Pack Stack message set may keep the host system's data bus clear of irrelevant traffic. In some embodiments, the battery leader 202 may transmit Battery Pack Stack messages to the host system 210 at a predetermined periodic frequency. The predetermined periodic frequency may be between 100 kilohertz to 0.2 hertz. In one example, the predetermined periodic frequency is 1 hertz. The battery leader 202 may transmit Battery Pack Stack messages to the host system 210 asynchronously when the message priority exceeds a threshold. In other words, the battery leader 202 may transmit Battery Pack Stack messages of high enough importance to the host system 210 outside of the predetermined periodic frequency.

Battery Pack Stack messages generally include information related to the battery stack 200. Battery Pack Stack messages may include, for example, remaining stack energy, remaining stack capacity, stack voltage, stack current, lowest cell voltage, highest cell voltage, lowest cell temperature, highest cell temperature, stack warning flags, stack maximum continuous charge current (dynamic based on available battery pack count), stack maximum continuous discharge current (dynamic based on available battery pack count), stack size, etc.

Each battery pack of the battery stack 200 may be configured to work in a parallel stack with other battery packs. As described herein, each battery pack can have different states of charge or age. Additionally, the battery stack 200 may support a service scenario where a single battery pack of battery stack needs to be replaced and the single battery pack may be hot swapped with another battery pack. Each battery pack BMS may be responsible for maintaining safe operating parameters. In other words, the BMS may ensure the battery pack stays within temperature, voltage, and current ranges that are considered safe for the battery pack. Furthermore, each battery pack BMS may synchronize with the BMSs of the other battery packs within battery stack 200 so that they can power the host system as a singular unit.

Each battery pack of the battery stack 200 may regulate its output using charge and discharge circuits (see, e.g., charge circuit 146 and discharge circuit 148 of FIG. 15). Moreover, each battery pack of battery stack 200 may deenergize its power terminals (see FIGS. 2A and 2B) by default. This may allow battery packs of varying age, voltage, or state of charge (SoC) to be connected in parallel with predictable results. The BMSs of each battery pack of the battery stack 200 may then arbitrate amongst each other to achieve a smooth turn-on transition to energize the host system. In contrast, known battery pack architectures may have the power terminals in an "always energized" configuration that require a user to follow a specific procedure in order to uninstall and install a new battery pack.

State of Charge Balancing

Battery stacks as described herein may allow a plurality of battery packs to be connected in parallel and be charged or discharged as a single unit. As the number of battery packs in the battery stack increases, so too does the standard deviation of each battery pack's internal impedance, temperature, interconnect impedance, and other factors that may affect the rate at which each battery pack in the battery stack depletes or accrues energy. Accordingly, the state of charge of the battery packs of the battery stack during charging or discharging may vary considerably.

For example, when a battery stack is powering a host system, one or two battery packs in a battery stack of ten battery packs may reach an undervoltage threshold while the other eight battery packs have 10 percent state of charge to go until they reach their undervoltage threshold. When this occurs, the battery stack may: (1) stop all discharging; or (2) may allow the remaining eight battery packs to continue discharging until their undervoltage thresholds are met. In the first scenario, useful energy may be left unused. In the second scenario, the remaining eight battery packs may provide considerably less power to the host system than ten battery packs. Depending on the power and energy needs of the host system, both of these scenarios may be undesirable.

When a battery stack is being charged, if one or two battery packs in a stack of ten packs reach their overvoltage threshold while the other eight battery packs still have 10 percent state of charge remaining before being fully charged, the battery stack may: (1) cease charging altogether; or (2) allow the remaining eight battery packs to continue charging. However, allowing the remaining eight battery packs to continue charging may result in a difference in dwell time after charge completion. Such difference in dwell time can adversely affect state of health (SoH) retention of the battery packs over the long term.

To overcome these problems, battery stacks in accordance with embodiments of the present disclosure may utilize state of charge balancing during charging and discharging. Such state of charge balancing may increase the available energy during a single discharge cycle of the battery stack and extend the life of the battery packs of the battery stack. The exemplary methods described below seek to equalize the state of charge of each battery pack in the system relative to their own state of health.

As used herein "state of charge" (SoC) may generally refer to the percentage of the remaining maximum effective capacity in amp hours (Ah) or stored energy in Watt hours (Wh). As used herein "state of health" (SoH) generally refers to the maximum effective capacity in Ah or stored energy in Wh as a result of degradation of the battery packs over time or usage. State of charge balancing methods as provided herein may choreograph dynamic on/off switching of the battery packs connected in parallel to make them arrive at their 0 percent and 100 percent state of charge at approximately the same time when discharging and charging, respectively. In other words, the battery packs of a battery stack may be within 3 percent state of charge of each other when one of the battery packs reaches both 0 percent and 100 percent state of charge.

Figure 17:
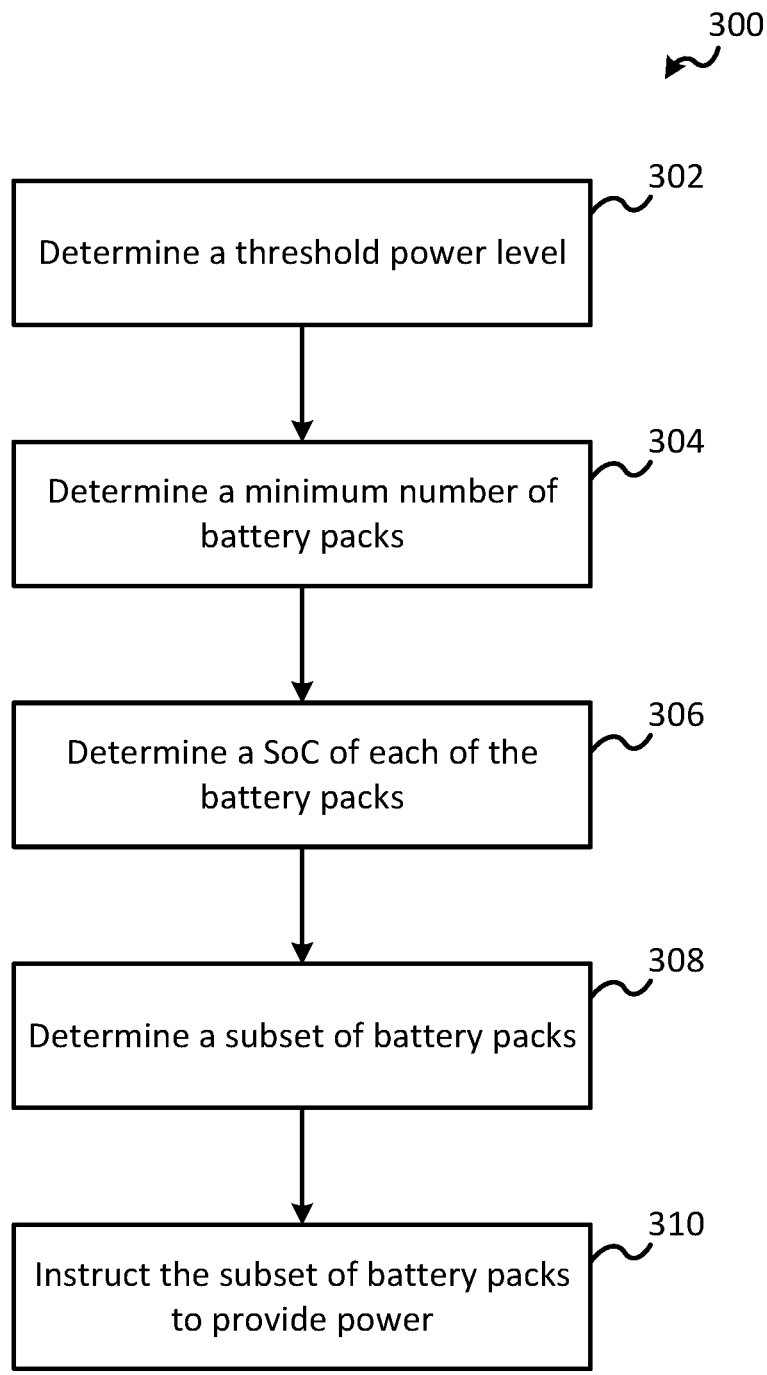
FIG. 17 is a flow diagram of a process for balancing a state of charge of battery packs of a battery stack while powering a host system in accordance with embodiments of this disclosure.

FIG. 17 is a flow diagram of a method or process 300 for balancing a state of charge of battery packs of a battery stack (e.g., battery stack 200 of FIG. 16) while powering a host system (e.g., host system 210 of FIG. 16). Although the method 300 is described herein with reference to battery stack 200 of FIG. 16 the method 300 may be implemented with any suitable battery stack.

The method 300 may involve determining at 302 a threshold power level required by a host system (e.g., the host system 210 of FIG. 16). The threshold power level may be a minimum available power required by the host system 210 in order to meet expected performance targets. In one example, the battery leader 202 may query or otherwise communicate with the host system 210 to determine the threshold power level required by the host system. In another example, the battery leader 202 may determine the threshold power level using a lookup table that pairs known host systems with threshold power levels. The battery leader 202 may determine an identity of the host system 210 and use the lookup table to determine the threshold power level.

The method 300 may next determine at 304 a minimum number of battery packs needed to provide the threshold level of power. The battery leader 202 may determine the amount of power that each battery pack of the battery stack 200 can supply. Based on the amount of power that each battery pack can supply, the battery leader 202 may determine the minimum number of battery packs needed to provide the threshold level of power to the host system 210. For example, if the threshold level of power is 1000 watts and the battery stack 200 includes ten batteries that can each supply 150 watts, the minimum number of batteries is seven.

The method 300 may also include determining at 306 a state of charge of each of the battery packs. The battery leader may query or otherwise communicate with each of the support batteries 204 for their state of charge. Each of the battery packs may determine their state of charge using their corresponding BMS and provide the state of charge to the battery leader 202.

The method 300 may further include determining at 308 a subset of the battery packs based on the minimum number of battery packs and the state of charge of each of the battery packs. The method 300 may further include instructing at 310 the subset of the battery packs to provide power at a duty cycle less than 100 percent. The battery leader 202 may determine a size or number of batteries of the subset of the battery packs based on the minimum number of battery packs. Any number of battery packs in the battery stack above the minimum number of battery packs may be turned on and off periodically for state of charge matching because they are not critical for instantaneous power delivery. The battery leader 202 may select the battery packs with the lowest state of charge to be in the subset of battery packs. Turning such packs on and off may provide increased runtime for the host system 210 because the battery packs with the lowest state of charge will provide less power over time.

The battery leader 202 may select a duty cycle for each of the subset of battery packs based on a state of charge of each of the battery packs. In one embodiment, the duty cycle may be at least 10 percent and no greater than 90 percent. For example, the duty cycle may be no greater than 90 percent and: at least 20 percent; at least 30 percent; at least 40 percent; at least 50 percent; at least 60 percent; at least 70 percent; at least 80 percent; or any other range between 10 percent and 90 percent. In one embodiment, a duty cycle for each battery pack of the subset of battery packs may be based on the state of charge of each of the battery packs. For example, the subset may include three battery packs where one battery pack is instructed to discharge at a duty cycle of 75 percent, another battery at a duty cycle of 50 percent, and the last battery at a duty cycle of 25 percent. In general, the duty cycle or cycles may be chosen to allow the battery packs to reach 0 percent state of charge at substantially the same time. The duty cycle may have a period of 100 milliseconds to 1 second. A period of the duty cycle may refer to the time it takes for a signal to complete a single on-and-off cycle.

The battery leader 202 may be configured to only execute state of charge balancing when one or more battery packs in the battery stack 200 is outside of a voltage range that denotes a linear section of the voltage versus capacity curve for the battery pack. As the capacity of a battery pack drops during discharge, the voltage also drops. In an exemplary voltage versus capacity curve for a single lithium-ion cell, the linear region may be between 4.0 V and 3.4 V. For a battery pack, such a curve would be scaled in voltage (based on number of cells in series) and capacity (based on number of cells in parallel). The voltage curve may be much steeper at the extremes of the state of charge, thus it may be more likely to slide through the undervoltage or overvoltage threshold at such extremes. Conversely, in the linear section of the voltage curve it is unlikely that a battery pack will pass through an overvoltage or undervoltage threshold. The battery leader 202 may determine a voltage of each of the battery packs. The battery leader 202 may instruct the subset of battery packs to provide power at a duty cycle of 100 percent (e.g., continuously) in response to the voltage of each of the battery packs being greater than a lower threshold voltage. In other words, the battery leader 202 may only execute state of charge balancing during discharge when one or more battery packs are below the lower threshold voltage. The lower threshold voltage may be a voltage of at least 3.4 V per series-configured cell within a battery pack.

The battery leader 202 may allow battery packs that reach their undervoltage or overvoltage thresholds to drop out of full power discharging or charging, respectively, and allow the remaining battery packs to continue discharging and charging up to the point where the minimum power required by the host system 210 can no longer be delivered by remaining battery packs. To ensure the minimum power required by the host system 210 can be supplied, the battery leader 202 may determine a number of battery packs that can provide power to the host system 210 based on the state of charge of each of the battery packs. The battery leader 202 may instruct the battery packs to cease providing power to the host system in response to determining that the number of battery packs that can provide power to the host system is less than the number of battery packs needed to provide the threshold level of power.

Figure 18:
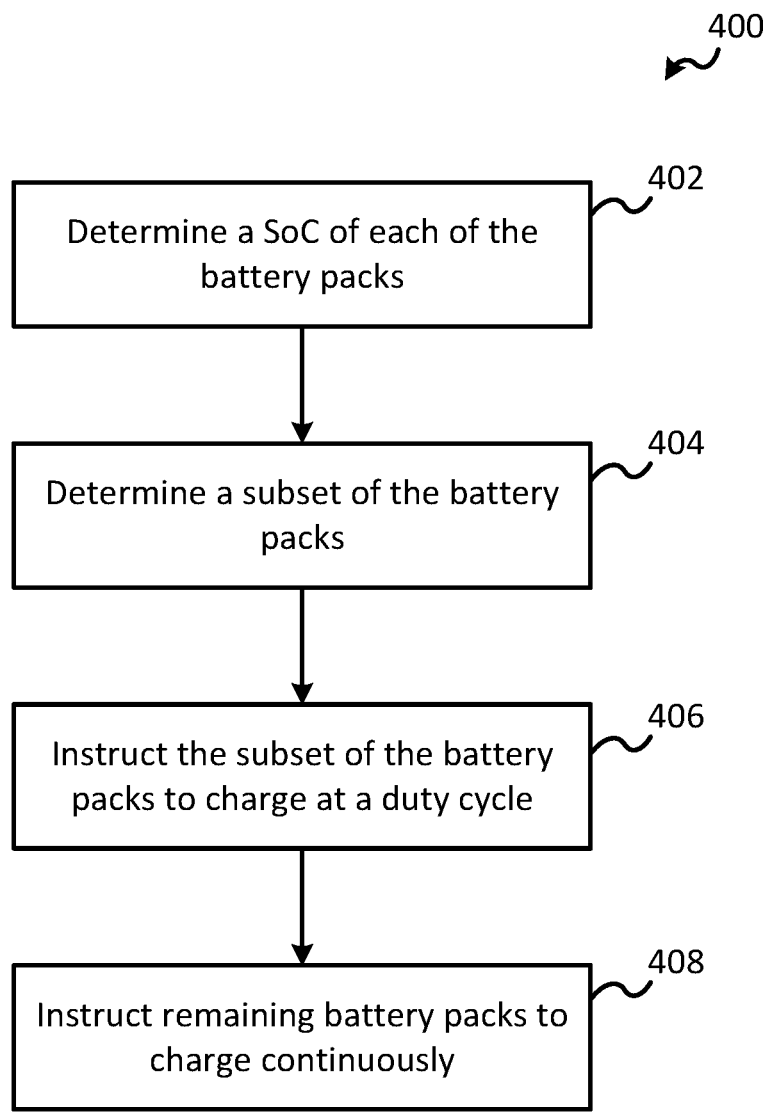
FIG. 18 is a flow diagram of a process for balancing a state of charge of battery packs of a battery stack while charging the battery packs in accordance with embodiments of this disclosure.

FIG. 18 is a flow diagram of a method or process 400 for balancing a state of charge of battery packs of a battery stack during charging of the battery packs. For example, the host system 210 of FIG. 16 may be a charger for charging the battery packs. The method 400 may include determining at 402 a state of charge of each of the battery packs. The battery leader may query or otherwise communicate with each of the support batteries 204 for their state of charge. Each of the battery packs may determine their state of charge using their corresponding BMS and provide the state of charge to the battery leader 202. The method 400 may further include determining at 404 a subset of the battery packs that have the highest state of charge based on the state of charge of each of the battery packs. For instance, the battery leader 202 may compare the states of charge to identify the batter packs with the highest states of charge.

The method 400 may further include instructing at 406 the subset of the battery packs to charge at a duty cycle less than 100 percent. The method 400 may further include instructing at 408 remaining battery packs to charge continuously. The remaining battery packs may be the battery packs of the battery stack 200 that are not in the subset of battery packs. The battery leader 202 may instruct the battery packs with the highest state of charge to charge at a reduced rate (e.g., duty cycle below 100 percent). In one embodiment, the duty cycle may be at least 45 percent and no greater than 55 percent. In one embodiment, a duty cycle for each battery pack of the subset of battery packs may be based on the state of charge of each of the battery packs. For example, the subset may include three battery packs where one battery pack is instructed to charge at a duty cycle of 75 percent, another battery at a duty cycle of 50 percent, and the last battery at a duty cycle of 25 percent. In general, the duty cycle or cycles may be chosen to allow the battery packs to reach 100 percent state of charge at substantially the same time.

The battery leader 202 may be configured to only execute state of charge balancing when one or more battery packs in the battery stack 200 is outside of a voltage range that denotes a linear section of the voltage versus capacity curve for the battery pack. As the capacity of a battery pack rises during charging, the voltage also rises. In an exemplary voltage versus capacity curve for a single lithium-ion cell, the linear region may be between 4.0 V and 3.4 V. For a battery pack, such a curve would be scaled in voltage (based on number of cells in series) and capacity (based on number of cells in parallel). The battery leader 202 may instruct the subset of battery packs to accept charging power at a duty cycle of 100 percent (e.g., continuously) in response to the voltage of each of the battery packs being less than an upper threshold voltage. In other words, the battery leader 202 may only execute state of charge balancing when one or more battery packs are greater than the upper threshold voltage. The upper threshold voltage may be a no greater than 4.0 V per series-configured cell within a battery pack.

The exemplary method of state of charge balancing during discharge provided above may minimize the amount of unused energy when the battery leader 202 halts all discharging due to undervoltage/power shortage. Similarly, state of charge balancing during charging may maximize the amount of energy in the system when battery charging stops due to overvoltage.

Stack Lifter

Figure 19:
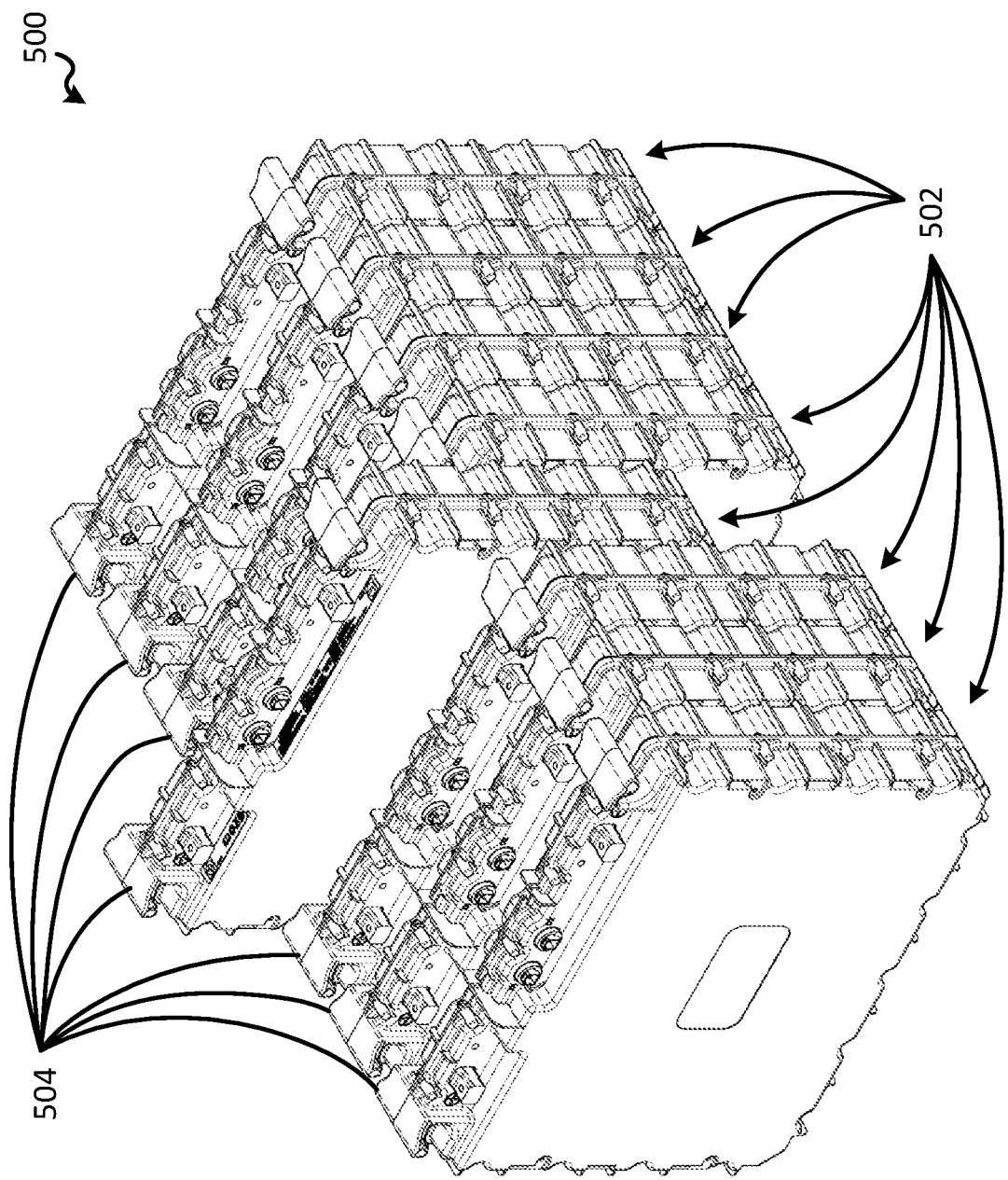
FIG. 19 is an isometric view of a battery stack of multiple battery packs.
Figure 20:
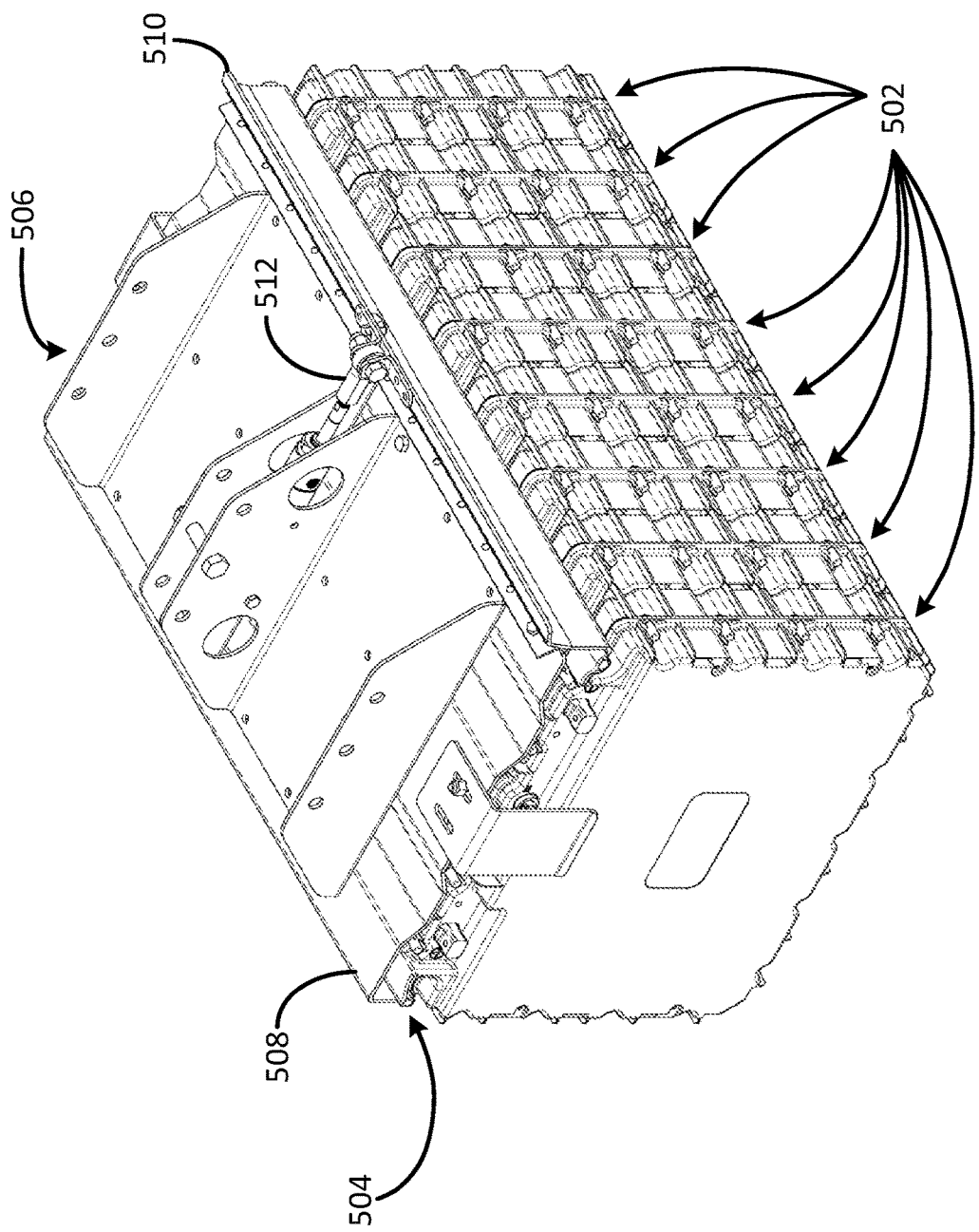
FIG. 20 is an isometric view of the battery stack of FIG. 19 and a stack lifter configured to lift battery packs.

FIG. 19 illustrates a battery stack 500 (like the stack 200 of FIG. 16) and FIG. 20 illustrates a stack lifter 506 configured to simultaneously lift the battery stack 500 (which may include a plurality of battery packs 502 that have, for example, a battery leader 202 and support batteries 204 as shown in FIG. 16). Each of the battery packs 502 may include integral handles 504. The integral handles 504 may be formed with the pack housing of each of the battery packs 502. The integral handles 504 may allow the battery packs 502 to be lifted individually or collectively. As shown in FIG. 20, the battery packs 502 may be lifted with the stack lifter 506.

The stack lifter 506 may include lift members 508, 510. The lift members 508, 510 may be configured to engage the integral handles 504 of each of the battery packs 502 (e.g., the battery leader and the support batteries) when the battery packs are aligned with one another. The stack lifter 506 may include a linear actuator 512 coupled to the lift member 510. The linear actuator 512 may be configured to move (e.g., pivot) the lift member 510 between an open position and a closed position. In the open position, the lift member 510 may be disengaged from the integral handles 504 and allow movement of the stack lifter 506 without lifting or otherwise moving the battery packs 502. In the closed position, the lift members 510 may be engaged with the integral handles 504, allowing the stack lifter to simultaneously lift the battery packs (e.g., the battery leader and support batteries).

The techniques described in this disclosure, including those attributed to the systems, or various constituent components, may be implemented, at least in part, in hardware, software, firmware, or any combination thereof. For example, various aspects of the techniques may be implemented by the processing apparatus or controller (e.g., controller 162 as described herein), which may use one or more processors such as, e.g., one or more microprocessors, DSPs, ASICs, FPGAs, CPLDs, microcontrollers, or any other equivalent integrated or discrete logic circuitry, as well as any combinations of such components, image processing devices, or other devices. The term "processing apparatus," "processor," or "processing circuitry" may generally refer to any of the foregoing logic circuitry, alone or in combination with other logic circuitry, or any other equivalent circuitry. Additionally, the use of the word "processor" may not be limited to the use of a single processor but is intended to connote that at least one processor may be used to perform the exemplary techniques and processes described herein.

Such hardware, software, and/or firmware may be implemented within the same device or within separate devices to support the various operations and functions described in this disclosure. In addition, any of the described components may be implemented together or separately as discrete but interoperable logic devices. Depiction of different features, e.g., using block diagrams, etc., is intended to highlight different functional aspects and does not necessarily imply that such features must be realized by separate hardware or software components. Rather, functionality may be performed by separate hardware or software components or integrated within common or separate hardware or software components.

When implemented in software, the functionality ascribed to the systems, devices and techniques described in this disclosure may be embodied as instructions on a computer-readable medium such as RAM, ROM, NVRAM, EEPROM, FLASH memory, magnetic data storage media, optical data storage media, or the like. The instructions may be executed by the processing apparatus to support one or more aspects of the functionality described in this disclosure.

Illustrative embodiments are described and reference has been made to possible variations of the same. These and other variations, combinations, and modifications will be apparent to those skilled in the art, and it should be understood that this invention is not limited to the illustrative embodiments set forth herein.

What is claimed is:

1. A battery cell magazine comprising:
a plurality of battery cells, each of the plurality of battery cells comprising:
a first base surface;
a second base surface; and
one or more sidewalls extending between the first base surface and the second base surface, the one or more sidewalls defining a surface area; and
a magazine housing defining a plurality of cell recesses each configured to receive a battery cell of the plurality of battery cells, each of the plurality of cell recesses defining an inner surface configured to be in direct contact with at least 50 percent of the surface area of the one or more sidewalls of the battery cell received therein, wherein the magazine housing comprises:
a first segment comprising a first portion of the inner surface of each of the plurality of cell recesses;
a second segment configured to oppose the first segment, the second segment comprising a second portion of the inner surface of each of the plurality of cell recesses; and
one or more retainers configured to secure the first and second segments relative to the plurality of battery cells.

2. The battery cell magazine as in claim 1, wherein the magazine housing is configured to provide an electrically insulative barrier between an anode and a cathode of each of the plurality of battery cells.

3. The battery cell magazine as in claim 1, wherein the magazine housing is formed of a material that is electrically insulative.

4. The battery cell magazine as in claim 1, wherein the magazine housing further defines at least one window that exposes a portion of at least one of the one or more sidewalls of one of the plurality of battery cells.

5. The battery cell magazine as in claim 1, wherein the magazine housing further comprises:
a first set of windows that expose at least a portion of the first base surface of each of the plurality of battery cells; and
a second set of windows that expose at least a portion of the second base surface of each of the plurality of battery cells.

6. The battery cell magazine as in claim 1, wherein the first and second segments each comprise a plurality of retainers, and wherein the plurality of retainers of the first segment releasably retain each received battery cell of the plurality of battery cells relative to the first segment, and the plurality of retainers of the second segment releasably retain each received battery cell of the plurality of battery cells relative to the second segment.

7. A battery pack comprising:
a plurality of battery cell magazines each according to claim 1; and
a battery management system operatively coupled to the plurality of battery cell magazines and configured to control charging and discharging of the plurality of battery cell magazines.

8. The battery pack as in claim 7, wherein the battery management system further comprises one or both of: a pre-discharge circuit configured to limit current flow out of the battery pack; and a pre-charge circuit configured to limit current flow into the battery pack.

9. The battery pack as in claim 7, wherein the battery pack further comprises a housing configured to house the plurality of battery cell magazines, the housing defining integral handles configured to assist with lifting the battery pack.

10. The battery pack as in claim 7, further comprising one or more thermistors, each of the one or more thermistors coupled to a sidewall of the one or more sidewalls of one of the plurality of battery cells.

11. A battery stack comprising:
a plurality of battery packs each comprising a plurality of battery cell magazines each according to claim 1;
a battery leader configured to communicate with a host system, the battery leader comprising a battery pack of the plurality of battery packs; and
one or more support batteries operatively coupled to the battery leader, each support battery comprising a battery pack of the plurality of battery packs,
wherein each battery pack comprises a battery management system configured to:
control charging and discharging of the associated battery pack; and
determine which of the battery packs is the battery leader.

12. The battery stack as in claim 11, wherein the battery management system of each of the one or more support batteries is configured to provide power based on a command signal provided by the battery leader.

13. The battery stack as in claim 11, wherein the battery leader is designated by a jumper or a switch.

14. The battery stack as in claim 11, wherein the battery leader is configured to perform at least one of:
control charging between the battery packs of the battery stack;
classify each of the one or more support batteries as an active usage battery pack or a pending usage battery pack;
provide a cease command signal to the battery management system of each pending usage battery pack to cease charging and discharging; and
classify a support battery of the one or more support batteries as a pending usage battery pack if the support battery has an active fault.

15. The battery stack as in claim 11, wherein each battery pack comprises:
a magazine housing defining a plurality of cell recesses each configured to receive a battery cell of a plurality of battery cells, each of the plurality of cell recesses defining an inner surface configured to be in direct contact with at least 50 percent of a surface area of one or more sidewalls of the battery cell received therein, wherein the magazine housing comprises:
a first segment comprising a first portion of the inner surface of each of the plurality of cell recesses;
a second segment configured to oppose the first segment, the second segment comprising a second portion of the inner surface of each of the plurality of cell recesses; and
one or more retainers configured to secure the first and second segments relative to the plurality of battery cells.

16. The battery stack as in claim 11, further comprising a stack lifter configured to simultaneously lift the battery leader and the one or more support batteries, the stack lifter comprising lift members configured to engage corresponding integral handles of each of the battery leader and the one or more support batteries when the battery leader and the one or more support batteries are aligned with one another.

* * * * *